(12) United States Patent
Ishihara

(10) Patent No.: US 11,899,960 B2
(45) Date of Patent: Feb. 13, 2024

(54) COMPUTING DEVICE AND CONTROL METHOD FOR TRANSMITTING I/O COMMAND TO STORAGE DEVICE

(71) Applicant: Kioxia Corporation, Tokyo (JP)

(72) Inventor: Takeshi Ishihara, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 127 days.

(21) Appl. No.: 17/549,667

(22) Filed: Dec. 13, 2021

(65) Prior Publication Data

US 2023/0072444 A1    Mar. 9, 2023

(30) Foreign Application Priority Data

Sep. 8, 2021    (JP) ................ 2021-146265

(51) Int. Cl.
*G06F 3/06* (2006.01)
(52) U.S. Cl.
CPC ............ *G06F 3/0655* (2013.01); *G06F 3/062* (2013.01); *G06F 3/0604* (2013.01); *G06F 3/0637* (2013.01); *G06F 3/0679* (2013.01)
(58) Field of Classification Search
CPC .... G06F 3/0604; G06F 3/0655; G06F 3/0679; G06F 3/062; G06F 3/0622; G06F 3/0637; G06F 3/0673
See application file for complete search history.

(56) References Cited

U.S. PATENT DOCUMENTS

| 7,934,094 B2 | 4/2011 | Oyama et al. |
| 8,819,790 B2 | 8/2014 | Eom et al. |
| 2006/0064589 A1 | 3/2006 | Taniguchi et al. |
| 2011/0167479 A1* | 7/2011 | Maes .................... H04L 9/3213 726/4 |
| 2019/0235774 A1* | 8/2019 | Benisty .................. G11C 16/30 |
| 2022/0283742 A1 | 9/2022 | Ishihara et al. |

FOREIGN PATENT DOCUMENTS

| JP | 2006-086907 A | 3/2006 |
| JP | 4377409 B2 | 12/2009 |
| JP | 2022-135641 A | 9/2022 |

OTHER PUBLICATIONS

Kaufman, C., Ed., "Internet Key Exchange (IKEv2) Protocol", RFC 4306, Dec. 2005, pp. 1-99.
Kaufman, C. et al., "Internet Key Exchange Protocol Version 2 (IKEv2)", RFC 5996, Sep. 2010, pp. 1-138.
Kaufman, C. et al., "Internet Key Exchange Protocol Version 2 (IKEv2)", STD 79, RFC 7296, Oct. 2014, pp. 1-142.

* cited by examiner

*Primary Examiner* — Jane W Benner
(74) *Attorney, Agent, or Firm* — Allen & Overy LLP

(57) ABSTRACT

According to one embodiment, a computing device executes an application including processing of inputting information from a nonvolatile memory unit and outputting information to the nonvolatile memory unit. The computing device includes a processing unit. The processing unit executes processing of receiving an I/O request to the nonvolatile memory unit from the application and generating one or more control commands for controlling the nonvolatile memory unit based on the I/O request. The processing unit executes processing of acquiring authorization information from a server. The processing unit executes processing of inserting or associating the acquired authorization information into or with the I/O request or the one or more control commands.

19 Claims, 16 Drawing Sheets

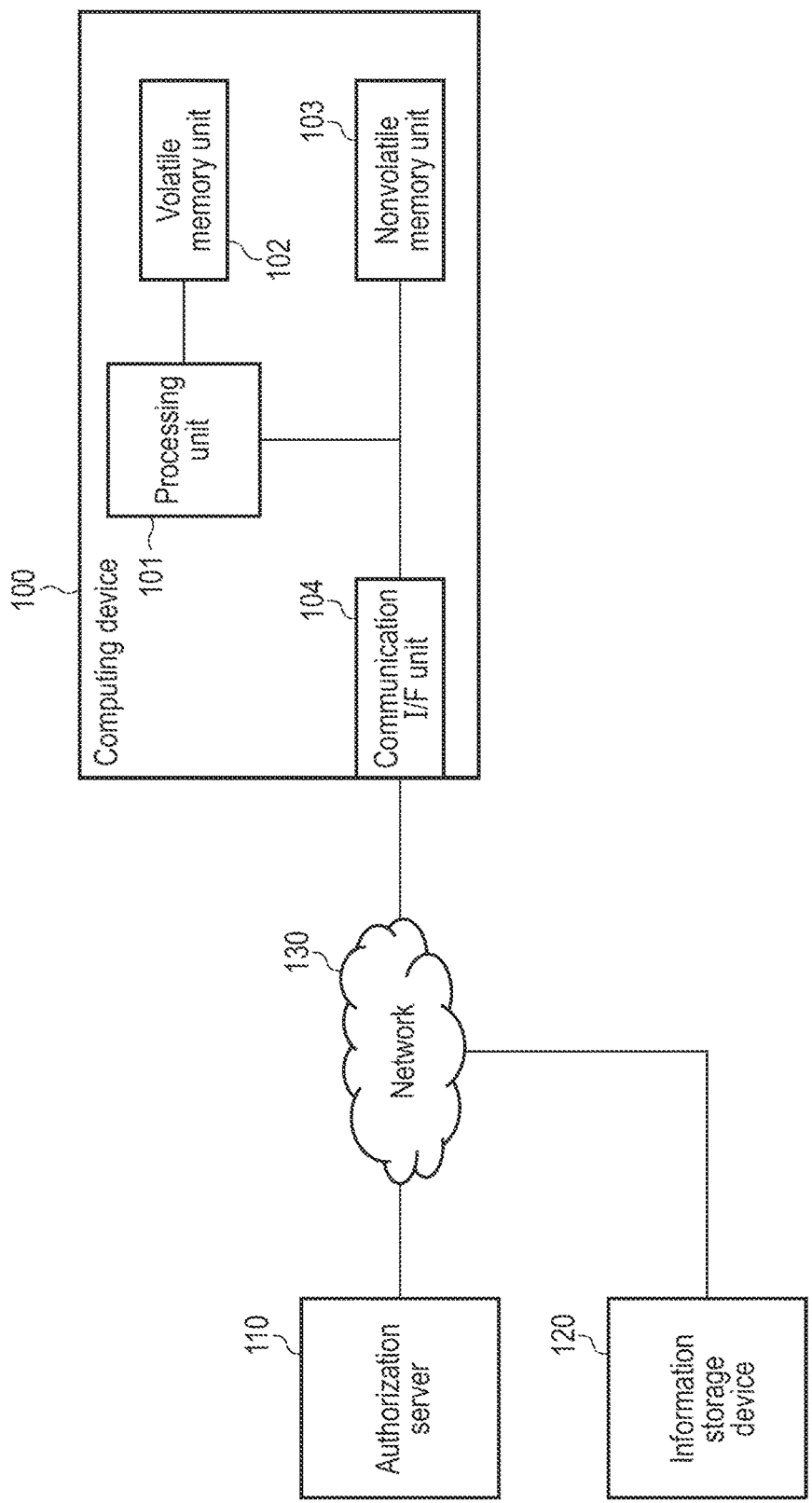
F I G. 1

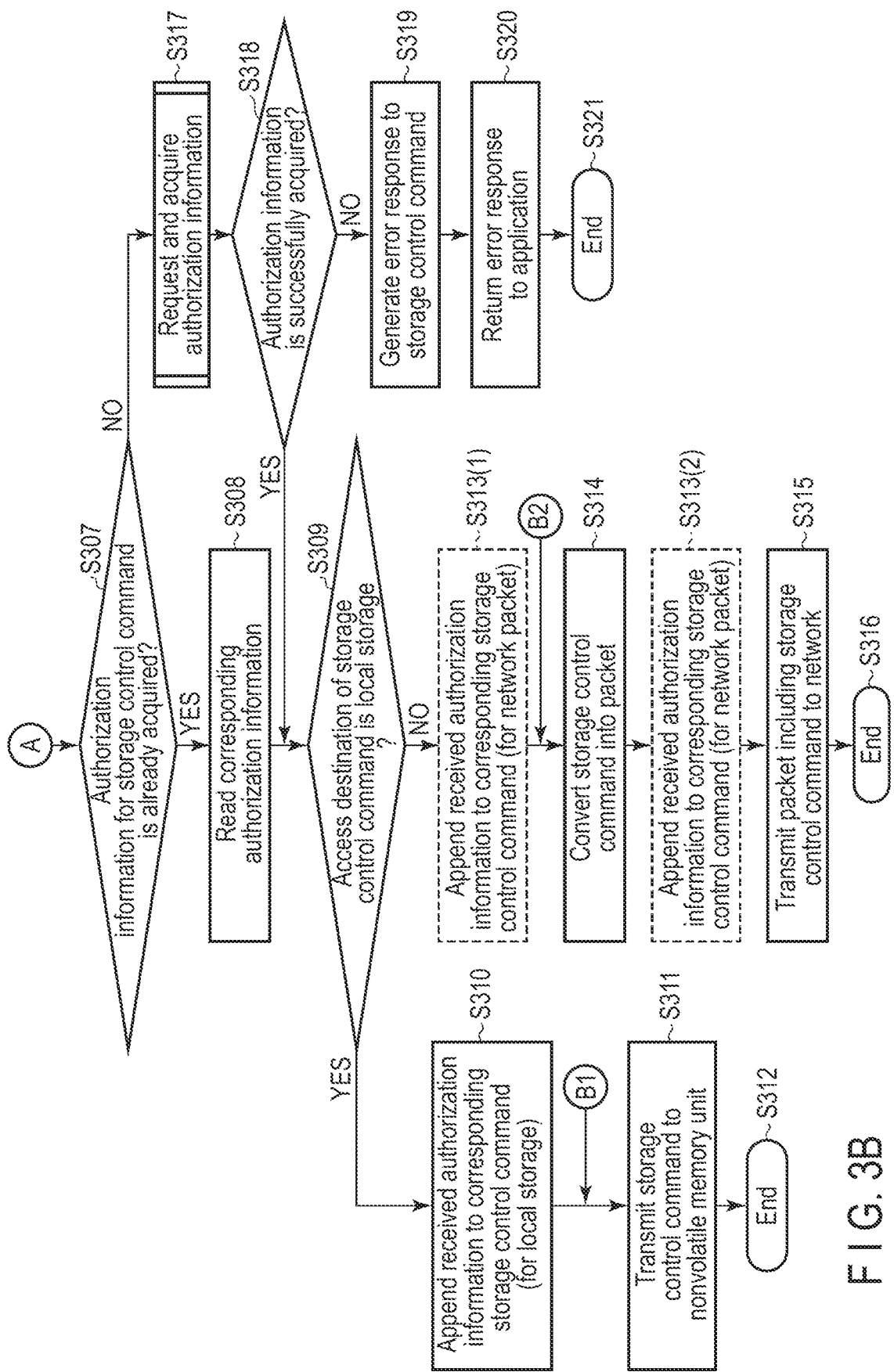
F I G. 3B

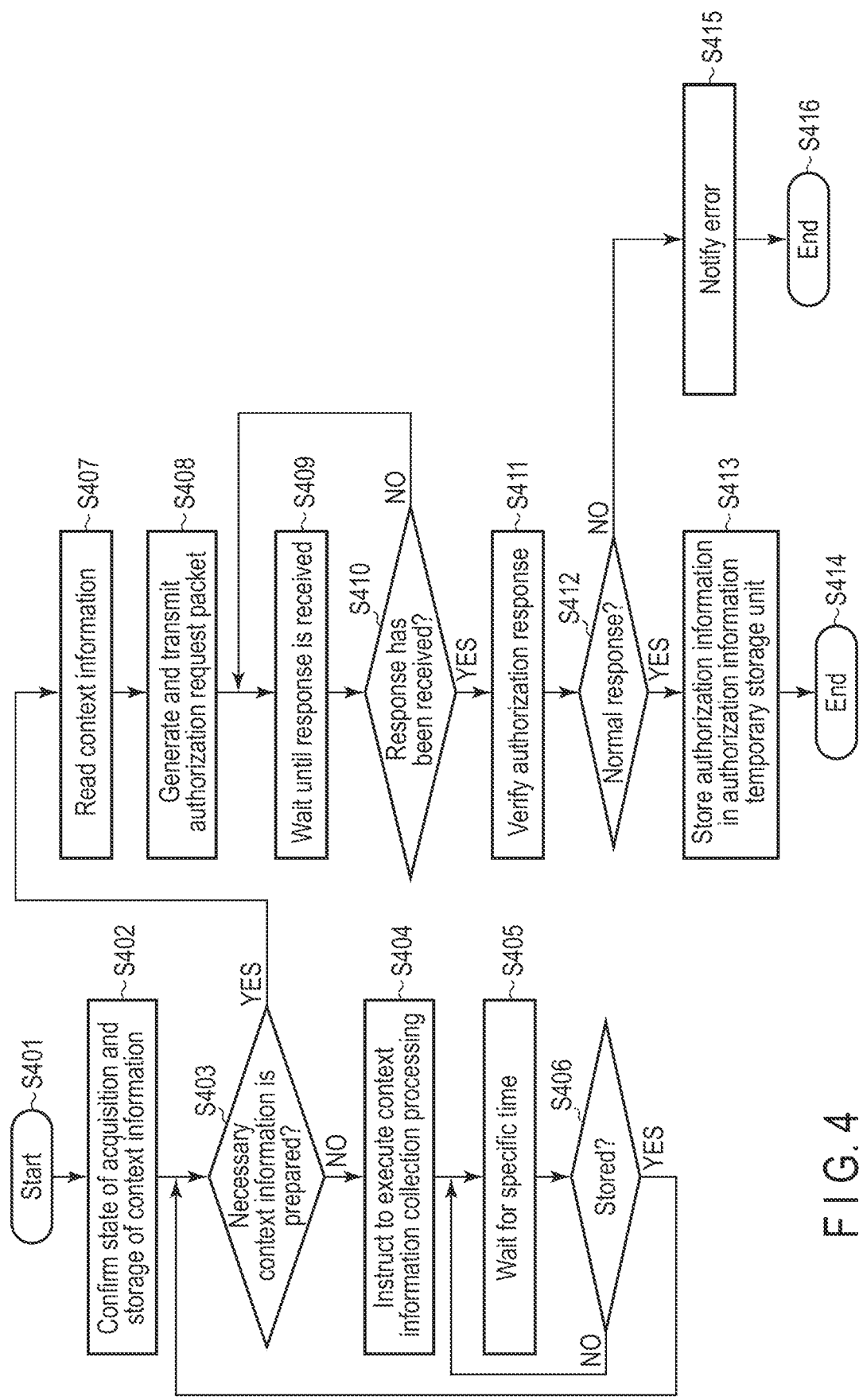
F I G. 4

F I G. 5

| | Issuer | User | Context information1 | ... | Command |
|---|---|---|---|---|---|
| 710 | Context information management DB | System | ... | ... | READ |
| 711 | Context information management DB | System | ... | ... | WRITE |
| | ... | ... | ... | ... | ... |

F I G. 7

| | Connection ID | Sequence number | Identifier of authorization information |
|---|---|---|---|
| 1010 | TUPLE_001 | SEQ1-1 | AUTHZ_ID_001 |
| 1011 | TUPLE_002 | SEQ2-1 | AUTHZ_ID_002 |
| 1012 | TUPLE_001 | SEQ1-2 | AUTHZ_ID_001 |
| 1013 | TUPLE_002 | SEQ2-2 | AUTHZ_ID_002 |
| | ⋮ | ⋮ | ⋮ |

F I G. 10

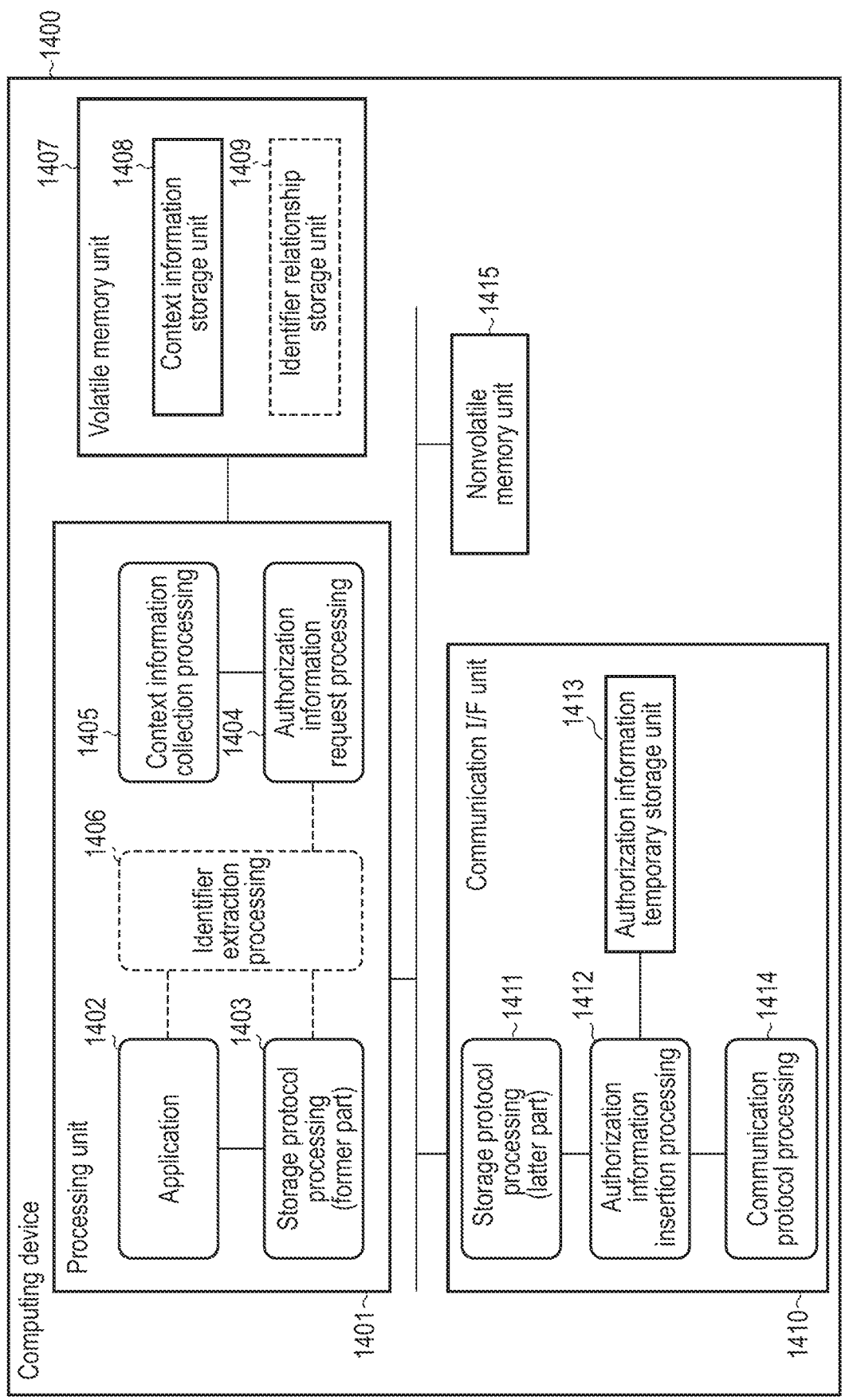
F I G. 14

COMPUTING DEVICE AND CONTROL METHOD FOR TRANSMITTING I/O COMMAND TO STORAGE DEVICE

CROSS-REFERENCE TO RELATED APPLICATIONS

This application is based upon and claims the benefit of priority from Japanese Patent Application No. 2021-146265, filed Sep. 8, 2021, the entire contents of which are incorporated herein by reference.

FIELD

Embodiments described herein relate generally to a computing device and a control method of transmitting an I/O command to an information storage device such as a hard disk drive (HDD) or a solid state drive (SSD).

BACKGROUND

Information storage devices such as a hard disk drive (HDD) and a solid state drive (SSD) are configured to read and write information on the basis of an I/O command from a computing device that is called a host device.

Recently, a technique for accessing an information storage devices over a network has also been used.

When a malicious program intrudes into software executed in a computing device, unauthorized access to an information storage device may be performed, which may cause data destruction or data theft.

Therefore, it is required to realize a new technology capable of preventing unauthorized access to an information storage device.

BRIEF DESCRIPTION OF THE DRAWINGS

FIG. 1 is a block diagram illustrating an example of a configuration of a storage system including a computing device according to a first embodiment.

FIG. 3B is a flowchart illustrating an operation sequence continued from FIG. 3A.

FIG. 4 is a flowchart illustrating an operation sequence of authorization information acquisition processing in the computing device according to the first embodiment.

FIG. 5 is a diagram illustrating an example of a configuration of authorization information stored in a volatile memory unit in the computing device according to the first embodiment.

FIG. 7 is a diagram illustrating an example of an exception list managed by the computing device according to the first embodiment.

FIG. 10 is a diagram illustrating an example of a correspondence relationship between information related to a transmitted packet and authorization information managed by the computing device according to the first embodiment.

FIG. 14 is a block diagram illustrating an example of a configuration of a computing device according to a fourth embodiment.

DETAILED DESCRIPTION

Figure 2:
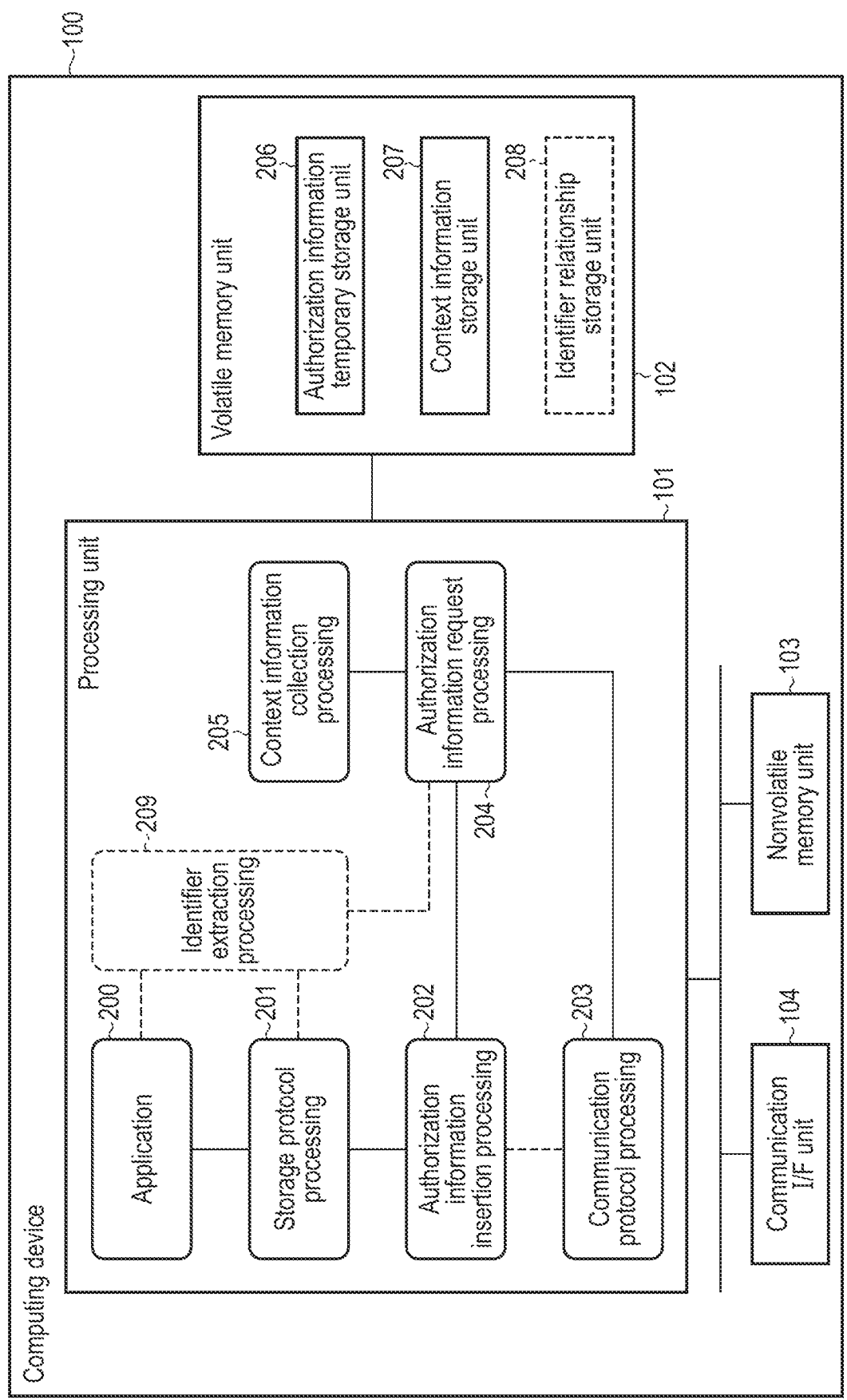
FIG. 2 is a block diagram illustrating an example of a configuration of the computing device according to the first embodiment.

Various embodiments will be described hereinafter with reference to the accompanying drawings.

In general, according to one embodiment, a computing device executes an application program including processing of inputting information from a nonvolatile memory unit and outputting information to the nonvolatile memory unit. The computing device includes a processing unit, a communication interface unit, and a temporary memory unit. The communication interface unit communicates with a device outside the computing device according to a communication protocol. The temporary memory unit temporarily stores information that is used by the processing unit. The processing unit executes the application program. The processing unit executes storage protocol processing of receiving a first I/O request to the nonvolatile memory unit from the application program, generating one or more first control commands for controlling the nonvolatile memory unit based on the first I/O request, and controlling the nonvolatile memory unit. The processing unit executes authorization information necessity determination processing of determining whether or not the first I/O request or the one or more first control commands require authorization information to access the nonvolatile memory unit. The processing unit executes authorization information acquisition processing of, in a case where it is determined that the first I/O request or the one or more first control commands require authorization information to access the nonvolatile memory unit, transmitting context information indicating at least one of a situation and a reason of generation of the first I/O request to an external server device and requesting the authorization information, and acquiring the authorization information from the server device, by communicating with the server device via the communication interface unit. The processing unit executes authorization information insertion processing of inserting or associating the acquired authorization information into or with the first I/O request or the one or more first control commands. The processing unit executes context collection processing of collecting the context information to be transmitted to the server device and storing the context information in the temporary memory unit before requesting the authorization information in the authorization information acquisition processing.

First Embodiment

FIG. 1 is a block diagram illustrating an example of a configuration of a computing device 100 according to a first embodiment and an example of a configuration of an information storage system including the computing device 100. The computing device 100 according to the first embodiment includes a processing unit 101 that executes an application program (hereinafter also referred to as an application) and the like, a volatile memory unit 102 such as a dynamic access memory (DRAM), a nonvolatile memory unit 103 including a solid state drive (SSD) in which information is stored by using a NAND flash memory or a hard disk drive (HDD), and a communication interface unit (communication I/F unit) 104 for connecting to a network. The computing device 100 is connected to an authorization server 110 over a network 130. Furthermore, the computing device 100 may be connected to an information storage device 120 capable of reading and writing information over the network 130. The ways in which each component is connected and configured are merely examples, and the described ones are not restrictive.

(Components and Description Thereof)

As illustrated in FIG. 1, the computing device 100 of the present embodiment includes the processing unit 101, the volatile memory unit 102, the nonvolatile memory unit 103, and the communication I/F unit 104. The volatile memory unit 102 temporarily stores information used by the processing unit 101. The communication I/F unit 104 is connected to the network 130 by using a communication standard such as IEEE 802.3, and the authorization server 110 and the information storage device 120 are connected to the network 130. The authorization server 110 is a server device that receives, over the network 130, an authorization request for requesting determination as to whether or not to permit execution regarding an information reading/writing request (i.e., an I/O request) generated in the computing device 100 of the present embodiment, and returns a result of the determination as authorization information. The information storage device 120 is an information storage device capable of reading and writing information through a storage protocol and communication protocol such as an iSCSI, an NVM Express™ (NVMe™) over Fabrics (NVMe-oF), or NVMe/TCP. The information storage device 120 is a device configured to be able to store information in one or more storage drives (SSD or HDD), a nonvolatile memory or a volatile memory with a battery backup (not in a shape of a drive), for a long period of time. In the present embodiment, the authorization server 110 and the information storage device 120 may be configured in any way and may be implemented in any form.

FIG. 2 is a functional block diagram illustrating processing executed on the processing unit 101 by using software. Although it is described here that processing exists inside the processing unit 101, actually, processing stored as a program in the nonvolatile memory unit 103 is read to the volatile memory unit 102, and the processing unit 101 executes each processing while referring to the volatile memory unit 102.

The application 200 is an application executed on the computing device 100, and is, for example, a word processing application, presentation software, or the like. The application 200 includes processing of reading and writing information from and to the nonvolatile memory unit 103 and the information storage device 120. Storage protocol processing 201 performs processing of appropriately mediating reading and writing of information (i.e., input and output of information) requested by the application 200 with the nonvolatile memory unit 103. For example, in a case where the nonvolatile memory unit 103 directly connected to the computing device 100 is connected by NVMe, the storage protocol processing 201 includes processing of Portable Operating System Interface for UNIX™ (POSIX), processing of a file system, processing of a block device, processing of a device driver, or the like provided by an operating system (OS). More specifically, the storage protocol processing 201 generates a storage control command based on reading and writing of information requested by the application 200. The storage control command is, for example, a read command or a write command. Authorization information insertion processing 202 assigns authorization information to an I/O request before, during, or after processing at any timing before, during, or after the storage protocol processing 201. Communication protocol processing 203 performs packet generation, transmission, and reception processing for transmitting and receiving information via the communication I/F unit 104.

Authorization information request processing 204 acquires authorization information by communicating with the authorization server 110 when the authorization information is required in the authorization information insertion processing 202, stores the authorization information in an authorization information temporary storage unit 206, and returns the authorization information to the authorization information insertion processing 202. Furthermore, in a case where corresponding authorization information is stored in the authorization information temporary storage unit 206, the authorization information request processing 204 reads the corresponding authorization information and returns the corresponding authorization information to the authorization information insertion processing 202 without communicating with the authorization server Context information collection processing 205 is processing of collecting information necessary when the authorization information request processing 204 requests the authorization server 110 to transmit authorization information. The collected information is stored in a context information storage unit 207 of the volatile memory unit 102. The stored information is used when the authorization information request processing 204 appropriately reads the information and transmits the information to the authorization server 110 as an authorization information acquisition request. Note that the context information collection processing 205 has two operation patterns, specifically, a case where the context information collection processing 205 is executed on the basis of an instruction from the authorization information request processing 204 and a case where the context information collection processing 205 is executed upon occurrence of a specific event. Examples of the latter case include a case where the communication I/F unit 104 is connected to the network 130, a case where login to the OS executed by the computing device 100 is performed, a case where a timer set in advance operates, and periodic operation performed at predetermined time intervals set in advance.

Identifier extraction processing 209 makes an identifier for identifying information used by the application 200 available when the authorization information request processing 204 requests authorization. For example, the identifier extraction processing 209 is realized by performing the following two kinds of processing. One processing is processing of extracting a first identifier of information (hereinafter, this first identifier is also referred to as an application level identifier) by monitoring an operation of the application 200 on the nonvolatile memory unit 103. The other processing is processing of monitoring the storage protocol processing 201 and acquiring a second identifier (hereinafter, this second identifier is also referred to as a storage level identifier) after conversion of the application level identifier included in an information read/write request issued by the application 200 into an I/O command (storage control command) for controlling the nonvolatile memory unit 103. The acquired application level identifier and storage level identifier are stored in an identifier relationship storage unit 208 of the volatile memory unit 102. The authorization information request processing 204 includes an appropriate identifier in a request for authorization information by referring to the relationship. Note that, in a case where the application level identifier and the storage level identifier are the same, this processing may be omitted. The corresponding identifier relationship storage unit 208 may also be omitted.

(Operation Sequence: Whole Sequence)

Figure 3A:
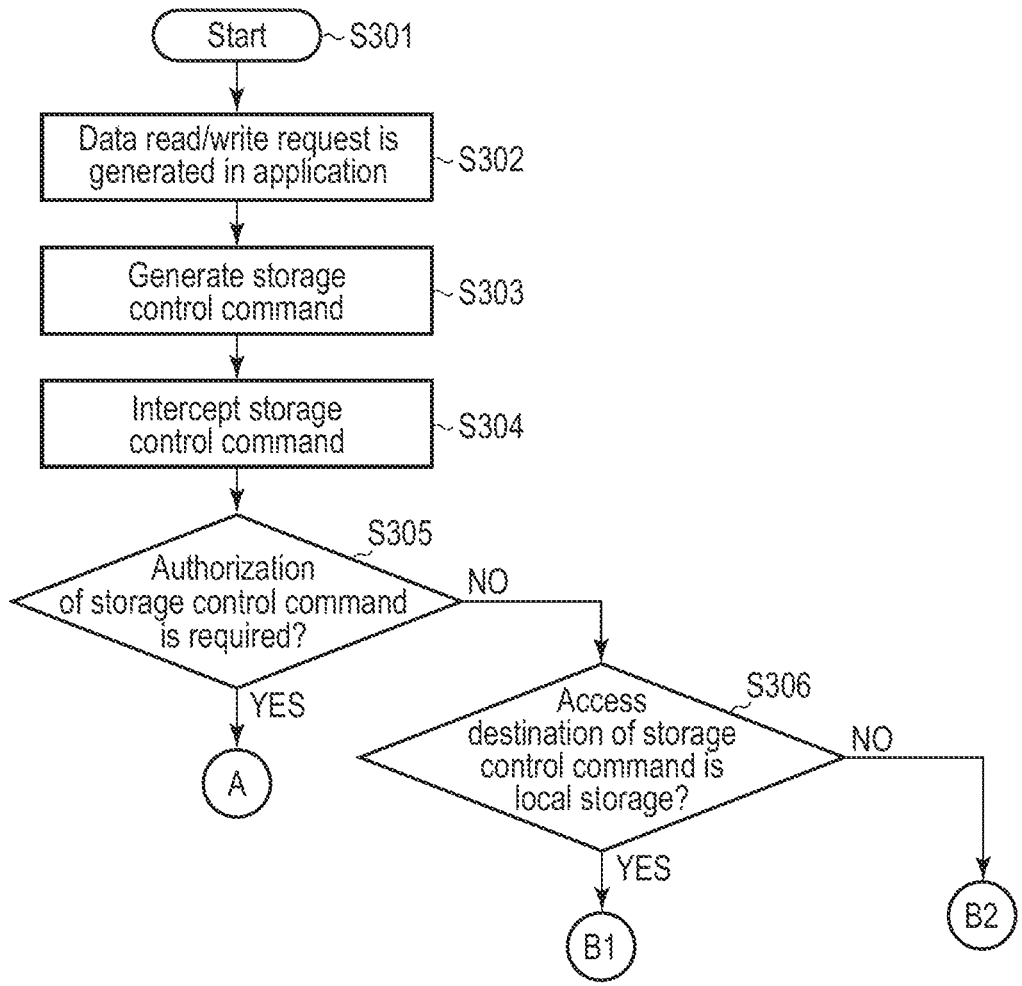
FIG. 3A is a flowchart illustrating an operation sequence of the computing device according to the first embodiment.

FIGS. 3A, 3B, and 4 are flowcharts illustrating an exemplary operation sequence of the computing device 100. The operation of the computing device 100 will be described with reference to these figures. As illustrated in FIG. 3A, the operation of the computing device 100 starts when a data read/write request is generated in the application 200 (steps S301 and S302). The application 200 sends the read/write request to the storage protocol processing 201, and a storage control command is generated by the storage protocol processing 201 (step S303). The generated storage control command is captured (intercepted) by the authorization information insertion processing 202 (step S304), and the authorization information insertion processing 202 determines whether or not the storage control command requires authorization (step S305). The authorization information insertion processing 202 includes authorization information necessity determination processing of determining whether or not the storage control command requires authorization information to access the nonvolatile memory unit 103 or the information storage device 120. Alternatively, the authorization information necessity determination processing provided separately from the authorization information insertion processing 202 may be executed by the processing unit 101. Note that determining whether or not the storage control command requires authorization information to access the nonvolatile memory unit 103 or the information storage device 120 can be said to be determining whether or not the read/write request corresponding to the storage control command requires authorization information to access the nonvolatile memory unit 103 or the information storage device 120.

In a case where the storage control command requires authorization (YES in step S305), the authorization information insertion processing 202 determines whether or not the storage control command is an authorized storage control command by executing the authorization information request processing 204 (step S307), as illustrated in FIG. 3B. Specifically, the authorization information request processing 204 confirms whether valid authorization information corresponding to the storage level identifier included in the storage control command is stored by referring to the authorization information temporary storage unit 206. In a case where the storage control command has been authorized, that is, in a case where corresponding authorization information is stored (YES in step S307), the corresponding authorization information is read (step S308) and returned to the authorization information insertion processing 202.

In a case where the storage control command is not authorized (NO in step S307), the authorization information request processing 204 acquires authorization information (step S317). Details of the authorization information acquisition processing will be described with reference to FIG. 4.

In a case where the authorization information is successfully acquired (YES in step S318), the authorization information is returned to the authorization information insertion processing 202. In a case where the authorization information is not successfully acquired (NO in step S318), the authorization information insertion processing 202 generates an error response for processing the storage control command as an error and returns the error response to the storage protocol processing 201 (step S319). Then, the storage protocol processing 201 returns an error of the read/write request to the application 200 (step S320). In this case, the processing ends here (step S321).

In a case where the authorization information is read in step S308 or in a case where the authorization information is successfully acquired in step S317, the storage protocol processing 201 determines whether an access destination of the storage control command to which the authorization information needs to be assigned is locally connected or connected over a network (step S309). That is, the storage protocol processing 201 determines whether the access destination of the storage control command to which the authorization information needs to be assigned is a local storage or a network storage. In a case of local connection (YES in step S309), the authorization information insertion processing 202 that has received the authorization information adds the received authorization information to the corresponding storage control command (step S310). Then, the storage control command is transmitted to the nonvolatile memory unit 103 (step S311), and the processing ends (step S312).

In a case of network connection (NO in step S309), the authorization information insertion processing 202 that has received the authorization information adds the received authorization information to the corresponding storage control command (step S313(1)), sends the storage control command to the communication protocol processing 203, and processes the storage control command into a packet that can be transmitted to the network (step S314). Alternatively, in the case of network connection (NO in step S309), the target storage control command is sent to the communication protocol processing 203, and after or in processing the storage control command into the packet that can be transmitted to the network in step S314, the authorization information insertion processing 202 adds the received authorization information to the storage control command (step S313(2)). Then, the communication protocol processing 203 transmits the packet to information storage device 120 via the communication I/F unit 104 (step S315), and ends the processing (step S316).

As illustrated in FIG. 3A, in a case where the storage control command does not require authorization (NO in step S305), the storage protocol processing 201 determines whether an access destination of the storage control command is locally connected or connected over a network (step S306).

In a case of local connection (YES in step S306), the operation of the computing device 100 continues to B1. Specifically, the processing proceeds to step S311 illustrated in FIG. 3B.

On the other hand, in a case of network connection (NO in step S306), the operation of the computing device 100 continues to B2. Specifically, the processing proceeds to step S314 illustrated in FIG. 3B. In this case, the operation in step S313(2) of adding authorization information to the storage control command is not performed since the storage control command does not require authorization.

Although response processing after the storage control command is transmitted to the nonvolatile memory unit 103 or the information storage device 120 is not described in the operation sequences of FIGS. 3A and 3B, it is assumed that response processing similar to that in a case where the present embodiment is not applied is performed and the processing returns to the application 200.

(Operation Sequence: Acquisition of Authorization Information)

Next, details of the authorization information acquisition processing performed by the authorization information request processing 204 will be described with reference to FIG. 4. As described with reference to FIGS. 3A and 3B, the authorization information acquisition processing 204 is executed in a case where authorization information corresponding to the storage control command being processed is not stored (NO in step S307, S401). When this processing is executed, the authorization information request processing 204 first confirms that context information necessary for request of authorization information is prepared (step S402). That is, the authorization information request processing 204 checks an acquisition/storage status of the context information in the context information storage unit 207.

In a case where the context information is prepared (YES in step S403), the authorization information request processing 204 proceeds to processing of requesting authorization information. In a case where the context information is not prepared (NO in step S403), the authorization information request processing 204 generates an instruction to execute the context information collection processing 205 (step S404).

In response to the instruction from the authorization information request processing 204, the context information collection processing 205 is executed. This processing is processing of collecting information obtained via the OS (not illustrated) executed by the computing device 100 and various devices (not illustrated) mounted in the computing device 100. Examples of the collected information, which depends on a policy of the authorization server 110, include a version of the OS that is currently executed, a state of application of a security patch, a status of a security countermeasure such as antivirus software, an identifier of a user being used, an identifier of the application 200 that is being executed, a state of connection to the network and an IP address, an application level identifier and a storage level identifier of information that is referred to among pieces of information stored in the nonvolatile memory unit 103 and the information storage device 120 (note that the information may be one that is referred to at a timing of the collection or may be one referred to during a period from a timing of previous collection to a timing of the current collection), a communication partner (similarly, the communication partner may be a partner of communication that is being performed at the timing of the collection or may be all of partners of communication performed during the period from the timing of the previous collection to the timing of the current collection), and contents of the communication (for example, including a URL referred to in a case where the application 200 is a web browser; a period for which a URL is collected is similar to that of the communication partner). In a case where a mechanism capable of acquiring a physical position based on a GPS or various wireless devices is provided, a current position of the computing device 100 may be collected. In a case where an illuminance sensor, an acceleration sensor, or the like is provided, information such as brightness at a location of use, whether the computing device 100 is stationary or moving, and in what posture the computing device 100 is used may be collected. In a case where a microphone is provided, voice at a preset time may be recorded and collected. In a case where a camera is provided, an image or a video may be recorded and collected at a preset timing. In any case, the context information collection processing 205 collects various information and stores the information in the context information storage unit 207 of the volatile memory unit 102.

After generating the instruction to execute the context information collection processing 205, the authorization information request processing 204 waits for a specific time for the context information to be stored (step S405). When the specific time has elapsed, a storage state of the context information storage unit 207 is confirmed (step S406). In a case where the context information is stored (YES in step S406), the processing returns to step S403. In a case where the context information is not stored (NO in step S406), the processing returns to step S405 and waits for the specific time again.

In a case where the context information has been prepared (YES in step S403), the authorization information request processing 204 reads the context information necessary for request of authorization information from the context information storage unit 207 (step S407). The context information necessary for request of authorization information is at least one of a situation in which and a reason why the corresponding read/write request occurred. Then, the authorization information request processing 204 generates an authorization request message including the read context information and sends the authorization request message to the communication protocol processing 203. The communication protocol processing 203 forms the authorization request message into a packet that can be transmitted and received over the network 130, and transmits the packet to the authorization server 110 via the communication I/F unit 104 (step S408).

Then, the authorization information request processing 204 waits until a response is received from the authorization server 110 (step S409). During this time, reception of a response may be checked at regular time intervals or the processing may be resumed by being triggered by the communication I/F unit 104 or the communication protocol processing 203. In any case, it is checked whether a response has been received (step S410), and if not (NO in step S410), the processing returns to step S409, in which the authorization information request processing 204 waits. In a case where a response is not obtained for a certain period, it is treated as a timeout error (not illustrated).

In a case where a response has been received (YES in step S410), the authorization information request processing 204 confirms (verifies) contents thereof (step S411). In a case where it has been confirmed that the response is normal (YES in step S412), the authorization information request processing 204 extracts authorization information included in the response and stores the authorization information in the authorization information temporary storage unit 206 of the volatile memory unit 102 (step S413). The authorization information request processing 204 thus ends the processing (step S414), but may notify the authorization information insertion processing 202, which called up the processing, about the successful acquisition.

In a case where it is not confirmed that the response is normal (NO in step S412), the authorization information request processing 204 notifies the authorization information insertion processing 202 to generate an error response for processing the corresponding storage control command as an error (step S415), and ends the processing (step S416).

The operation sequence described above is a basic operation sequence of the computing device 100 in the present embodiment.

(Authorization information temporary storage unit) The authorization information temporary storage unit 206 configured in the volatile memory unit 102 will be described in more detail below. FIG. 5 illustrates an example of a configuration of the authorization information temporary storage unit 206. FIG. 5 illustrates an example of a configuration in a table format (table 500). An actual data structure may be a list, an array, a hash table, or the like. Each entry in the table 500 includes an identifier 501 identifying authorization information, an expiration time 502 of the corresponding authorization information, a context information hash value 503, and the authorization information 504 itself. The authorization information 504 may indicate the authorization information itself received from the authorization server 110 or may indicate an address for an area in the volatile memory unit 102 in which the authorization information is stored. Only one or both of these pieces of information may be used in one implementation. For the sake of explanation, the row 510 is an example of a case where the former information is used, and the row 511 is an example of a case where the latter information is used (the row 511 and the column 504 indicate an address of an area 505 where the authorization information is stored).

The identifier in the column 501 is an identifier generated on the basis of context information that is used when the authorization information is requested. For example, the identifier is generated by applying a hash function or the like to information based on a combination of an identifier that is used in an application or the storage protocol processing 201 and is extracted by the identifier extraction processing 209, and a part of the context information. In this case, more detailed identification information may be separately stored in preparation for collision of the hash function, and a mechanism such as a bloom filter may be used to keep a search cost low.

The expiration time in the column 502 is an expiration time that is notified when the authorization information is acquired from the authorization server 110 or is included in the acquired authorization information. The expiration time indicates a time for which it is unnecessary to acquire authorization information of the same context information again. The authorization information insertion processing 202 checks the hash value of the context information and the expiration time and determines whether the authorization information can be reused.

The context information hash value in the column 503 is a hash value of context information transmitted when authorization information is requested from the authorization server 110. If this value remains the same, it is determined that the situation has not changed. That is, the context information hash value is used as an identifier of the corresponding context information. Note that a constantly changing value such as time may be, for example, excluded or adjusted to an appropriate value (for example, a current time may be divided into units of ten minutes) when the hash value is calculated. Note that although the identifier in the column 501 is also a value calculated from the context information, the context information hash value is calculated from all the context information transmitted to the authorization server 110 (in principle). On the other hand, the identifier in the column 501 is calculated from a part of the context information that can distinguish a generation source of the authorization information (this reduces overhead of identifier calculation).

(Context Information Storage Unit)

Figure 6:
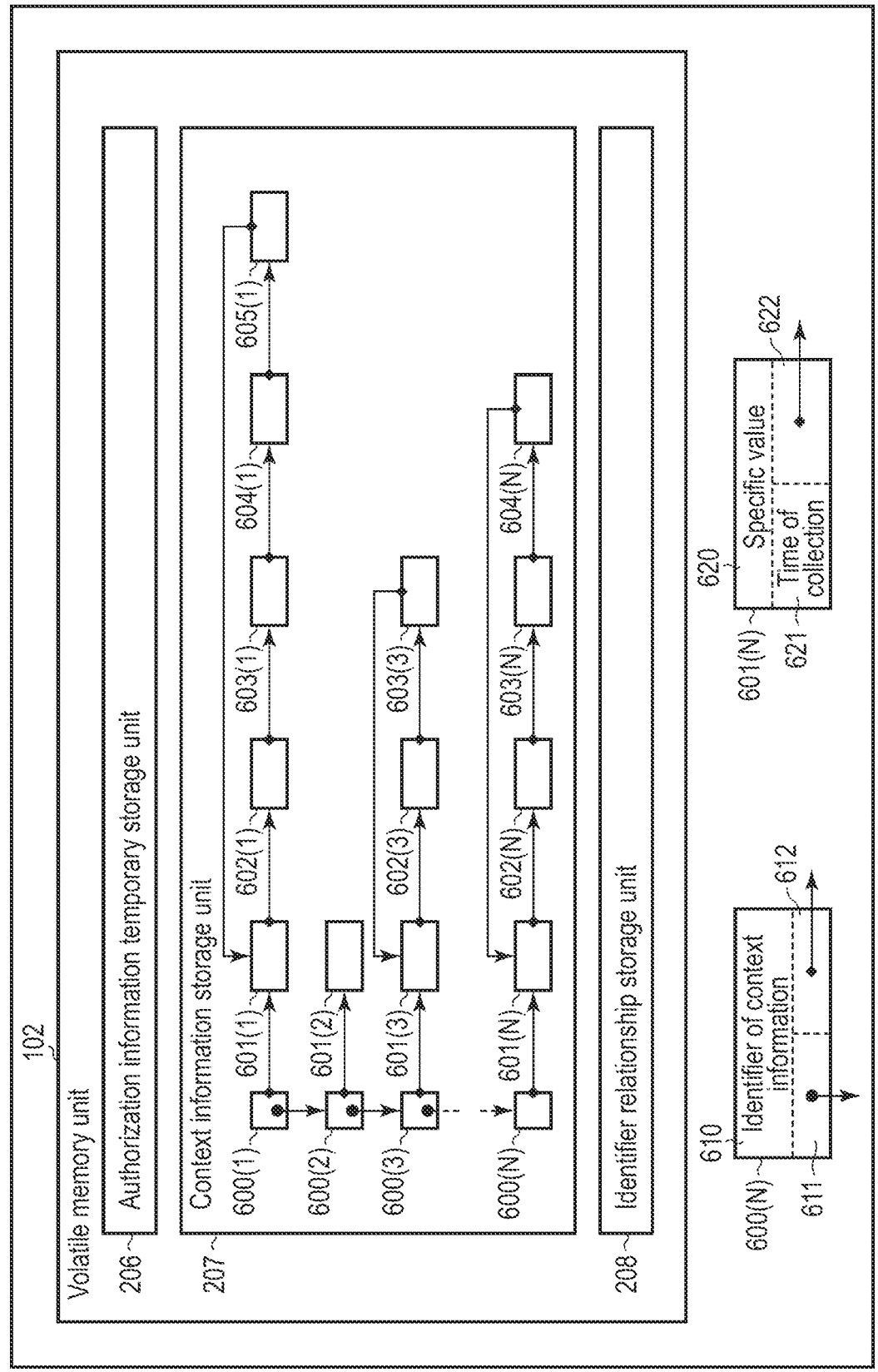
FIG. 6 is a diagram illustrating an example of a configuration of context information stored in the volatile memory unit in the computing device according to the first embodiment.

The context information storage unit 207 configured in the volatile memory unit 102 will be described in more detail below. As described with reference to FIG. 4, the context information may be continuously collected and stored. One example of a method for storing the context information is a method of creating a list structure for each collected information and storing the list in the context information storage unit 207, as illustrated in FIG. 6. In this example, a list is created for each context information to be stored, and each list further constitutes a list. Note that although a singly linked list is used, a doubly linked list may be used.

The first list includes elements 601(1) to 605 (1) the second list includes an element 601(2), the third list includes elements 601(3) to 603(3), and the fourth list includes elements 601(N) to 604(N). Each list represents one kind of context information. Furthermore, each list includes, for example, an index (identifier) for specifying the kind of context information and a link to the latest value, which are specifically the index elements 600(1), 600(2), 600(3), . . . , and 600(N).

Although details of each element are illustrated in a lower part of FIG. 6, the one illustrated in FIG. 6 (even the entire configuration thereof) is an example, and each element may be configured in another form. For example, as illustrated on the left side of the lower part of FIG. 6, the index element 600(N) includes an identifier for specifying the kind of corresponding context information, a link 612 to an element including the latest value of the context information (for example, the element 601(N)), and a link 611 to an index element of another kind of context information. Furthermore, for example, as illustrated on the right side of the lower part of FIG. 6, the element 601(N) includes a specific value 620 of the corresponding context information, a time 621 of collection of the value, and a link 622 to an element including a value collected immediately before the value (for example, the element 602(N)).

Furthermore, database software may be used as a mechanism that can flexibly store various kinds of information. A format of the database can be any format such as a Key-Value (KV) database, a time series database, or a relational database. The format may be changed according to context information to be stored or the whole database may be constituted by one type of database. In this case, the database software itself operates in the processing unit 101, and stores information to be stored and management information in the context information storage unit 207. Although context information is stored in the context information storage unit 207 of the volatile memory unit 102, a part or all of the context information may be stored in the nonvolatile memory unit 103.

In this case, a storage control command generated when the database application stores or reads information into or from the nonvolatile memory unit 103 is processed as a storage control command that does not require authorization. This may be managed as an exception list as illustrated in FIG. 7 or may be fixedly set as an embedded rule in the authorization information insertion processing 202.

(Exception List)

As illustrated in step S305 of FIG. 3A, the authorization information insertion processing 202 needs to distinguish a storage control command that needs insertion of authorization information and a storage control command that does not need insertion of authorization information. This distinguishing processing may be realized on the basis of some sort of distinguishing algorithm, or may be simply realized by using a safe list and a block list. The safe list is a list describing a condition on which insertion of authorization information is not needed, and in a case where a storage control command does not satisfy the described condition (that is, by default), it is determined that insertion of authorization information into the storage control command is needed. The block list is a list describing a condition on which insertion of authorization information is needed, and in a case where a storage control command does not satisfy the described condition (that is, by default), it is determined that insertion of authorization information into the storage control command is not needed.

FIG. 7 is an example of the safe list. The necessity of insertion is set by using context information. As an example, in FIG. 7, pieces of context information such as an application 701 that issued a storage control command, a user 702 using the application, and some sort of context information) 703 are combined. A command 704 that needs or does not need insertion is specified by the combination of the pieces of context information.

Although only a condition used in the authorization information insertion processing 202 is illustrated in the example of FIG. 7, the exception list may be used in other cases. Examples of the other cases include reading of a program by an application that does not need protection or an OS.

(Identifier Extraction Processing and Identifier Relationship Storage Unit)

As described above, the identifier extraction processing 209 performs two kinds of processing: (1) extracting an application level identifier used to specify information by the application 200 and (2) generating a correspondence with a storage level identifier used to identify information of the nonvolatile memory unit 103 and the information storage device 120 by the storage protocol processing unit 201. Although details of the processing will be omitted because it depends on each implementation, the following method available in each processing can be illustrated as an example.

The application level identifier used to specify information by the application 200 can be extracted by monitoring an open( ) system call in a case where information is managed as a file. For example, in a case where execution of a system call
PID=11298
open("/data/confidential_info.dat", O_RDONLY, . . . ) has been extracted, this indicates that a process having 11298 as a PID (process ID) is attempting to read a file "/data/confidential_info.dat". A relationship between a PID and a process name, a relationship between a PID and a location of an execution program (for example, the process of PID=11298 is/usr/sbin/example_daemon), and the like can be easily obtained by using a function of the OS.

Meanwhile, in order to associate the application level identifier (in this example, the file name) specified in the above procedure with a storage level identifier that is stored in a storage control command by the storage protocol processing 201, a correspondence relationship between these identifiers is extracted while a process of conversion between these identifiers is performed in the storage protocol processing 201 is performed. In the present example, in which information is managed as a file, the correspondence relationship is extracted when "/data/confidential_info.dat" is converted into a logical block address (LBA) for specifying a storage location on the nonvolatile memory unit 103 in processing of a file system executed after the open( ) system call (which may be a read( ) or write( ) system call instead of the open( ) call). However, since a file has a length, the correspondence relationship needs to be expressed by an address specifying a head, and a length. In some cases, one file may be stored in divided small fragments. In such a case, the correspondence relationship is extracted for each conversion.

Figure 8:
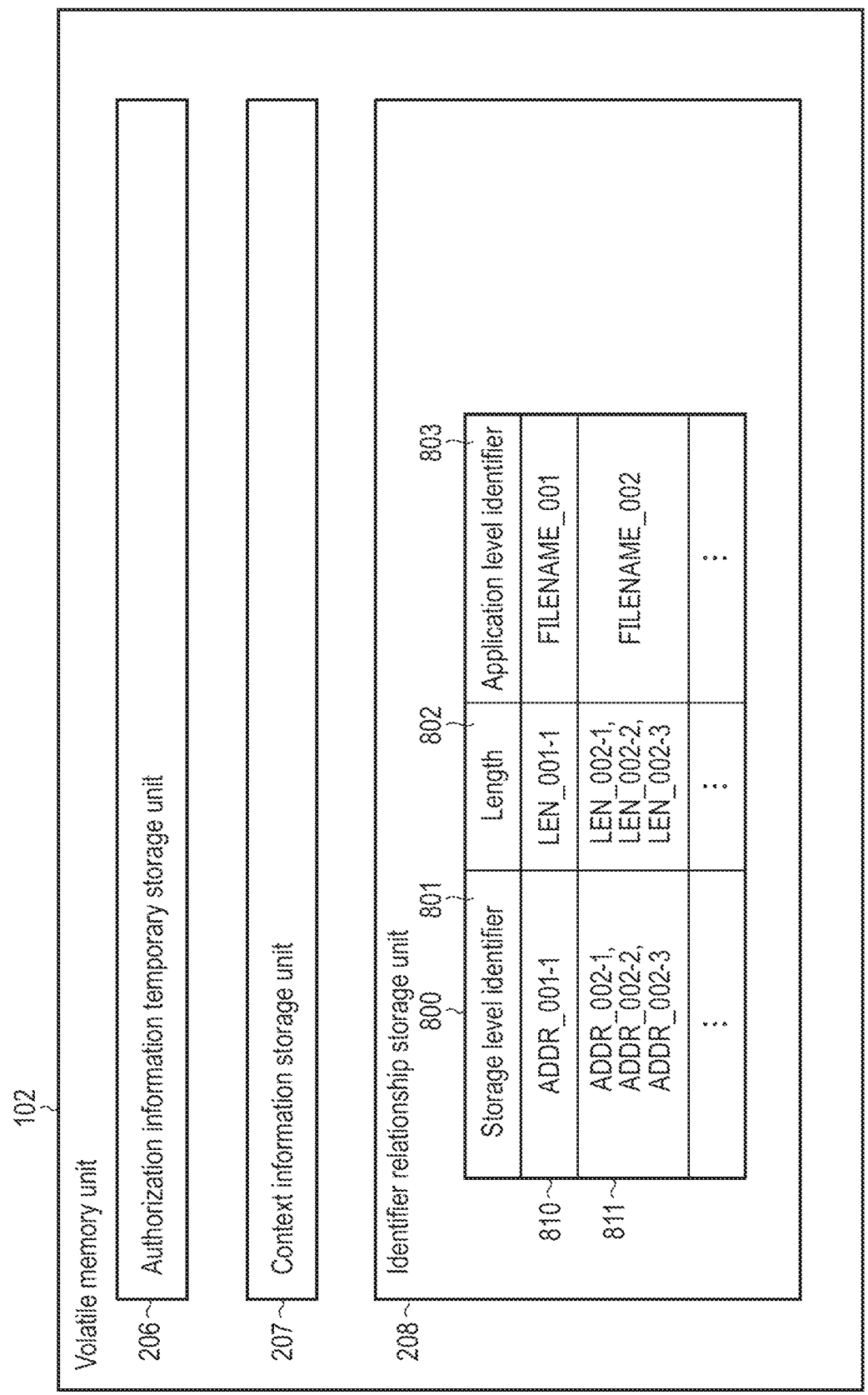
FIG. 8 is a diagram illustrating an example of a configuration of an identifier correspondence relationship stored in the volatile memory unit in the computing device according to the first embodiment.

The identifier extraction processing 209 stores the extracted correspondence relationship in the identifier relationship storage unit 208 of the volatile memory unit 102, as illustrated in FIG. 8. Examples of a data structure for storing this relationship include a Key-Value Store (KVS) format in which a set of a storage level identifier and a length is used as a key and an application level identifier is used as a value, a linked list format using a combination of three pieces of information, and an array format. In FIG. 8, a storage level identifier 801, a length 802, and an application level identifier 803 are stored in a table 800. A row 810 is an example in which a file name and an address correspond to each other on a one-to-one basis, and stores an address and a length that correspond. A row 820 is an example in which a file is stored in divided small fragments, and stores a plurality of addresses and lengths.

When determining necessity of request of authorization information in step S307 of FIG. 3, the authorization information request processing 204 receives a storage level identifier (and a length) generated by the storage protocol processing 201 from the authorization information insertion processing 202, and identifies an application level identifier from the storage level identifier (and the length) by referring to the identifier relationship storage unit 208. Then, an identifier necessary for searching the authorization information temporary storage unit 206 is generated by using the application level identifier and other context information. For example, the authorization information request processing 204 generates a hash value calculated by applying a hash function to the application level identifier and at least a part of the context information, as the identifier necessary for searching the authorization information temporary storage unit 206.

(Authorization Information Adding Processing; Case of Local Storage)

As illustrated in step S310, step S313(1), and step S313(2) of FIG. 3B, the authorization information insertion processing 202 performs processing of assigning appropriate authorization information to a storage control command. In order to assign appropriate authorization information to a storage control command, the authorization information insertion processing 202 inserts the authorization information into the storage control command or associates the authorization information with the storage control command. Note that the authorization information insertion processing 202 may insert the authorization information into a read/write request corresponding to the storage control command or associate the authorization information with the read/write request corresponding to the storage control command.

First, a case where authorization information is assigned to a storage control command for a local storage will be described. Although NVMe is assumed in the following description, another storage protocol may be used.

A first method is a method of adding a dedicated command. This method is a method of defining a command for notification of authorization information as one of commands defined in NVMe such as an Admin command set for management and an I/O command set for executing I/O. In this case, a correspondence relationship between authorization information and a command controlled by the authorization information need be defined and notified.

A FUSED Operation function may be used as one of methods for defining the relationship. The FUSED Operation is an operation to obtain one effect by treating two consecutive commands as one, and authorization information is transferred by the first command and an I/O command is transferred by the second command. On a side receiving the commands, in a case of "unauthorized" at the stage of processing the first authorization information, it is regarded that an error has occurred, and the second I/O command is not executed. In order to realize this, when receiving a storage control command into which authorization information is to be inserted, the authorization information insertion processing 202 generates the first command including the authorization information while regarding the storage control command as the second command. Both commands are marked as FUSED Operation and transferred to the nonvolatile memory unit 103.

Another method of defining the relationship is a method of storing an identifier of a storage control command to be authorized in a dedicated command. Upon receiving a storage control command into which authorization information is to be inserted, the authorization information insertion processing 202 extracts or generates a corresponding identifier and suspends transmission of the storage control command. Then, a dedicated command for transmitting the authorization information is generated, and the identifier and the authorization information are included as internal information thereof. Finally, the dedicated command and the storage control command into which the authorization information is to be inserted are transferred to the nonvolatile memory unit 103 in this order.

A second method is a method of handling as metadata. In a command of NVMe, a field for handling metadata for conveying information associated with the command is prepared, so that a start position of metadata arranged after the corresponding command can be designated or a location of metadata stored as another buffer can be notified. In a case where this function is used, when receiving a storage control command into which authorization information is to be inserted, the authorization information insertion processing 202 designates an address of a buffer in which the authorization information is stored in the field of the meta information pointer. After that, as usual, the storage control command into which the authorization information is to be inserted is transferred to the nonvolatile memory unit 103. Note that the authorization information may be rearranged in a buffer continuous with the target storage control command, and then the position thereof may be designated in the field of the meta information pointer.

(Authorization Information Adding Processing; Case of Network Storage)

Next, a case where authorization information is assigned to a storage control command for a storage connected over the network 130 will be described. For example, in a case where connection to a storage provided in the external information storage device 120 communicable via the communication I/F unit 104 and the network 130 is detected, the authorization information insertion processing 202 notifies the information storage device 120 about the authorization information by a method using any one of a read/write request (I/O request), a storage control command, a header portion or a data portion of a communication protocol including the read/write request or the storage control command, and a header portion or a data portion of a first packet different from a second packet of the communication protocol including the read/write request or the storage control command. In a case where the authorization information is notified by using the header portion or the data portion of the first packet different from the second packet, the communication protocol processing 203 and the communication I/F unit 104 use, for example, physical connection or logical connection different from physical connection or logical connection for transmitting and receiving the second packet.

Although a case of NVMe/TCP will be described as an example below, a similar way can be applied to other network storage protocols.

A first method is a method of assigning authorization information to a part of the NVMe protocol carried by NVMe/TCP. In this case, it is only necessary to perform similar processing to the case of a local storage described above. Since the authorization information can be assigned before processing into a packet, this corresponds to the case of assigning the authorization information in step S313(1) in the flowchart of FIG. 3B.

However, even in the same NVMe, a restriction may vary depending on a communication protocol for transmitting a command (for example, transmission in a state where meta information is separated from a target command is not supported in NVMe/TCP). Therefore, only applicable methods are used.

A second method is a method of assigning authorization information to a part of a communication protocol. In this case, authorization information is assigned after processing into a packet or in a process of processing into a packet. This corresponds to the case of assigning the authorization information in step S313(2) in the flowchart of FIG. 3B. In the case of this method, for example, there are three possibilities: a method of adding as an option of an IP header (IPv4 header option, IPv6 Destination Options Header), a method of adding as an option of a TCP header, and a method of adding as a new field.

Figure 9:
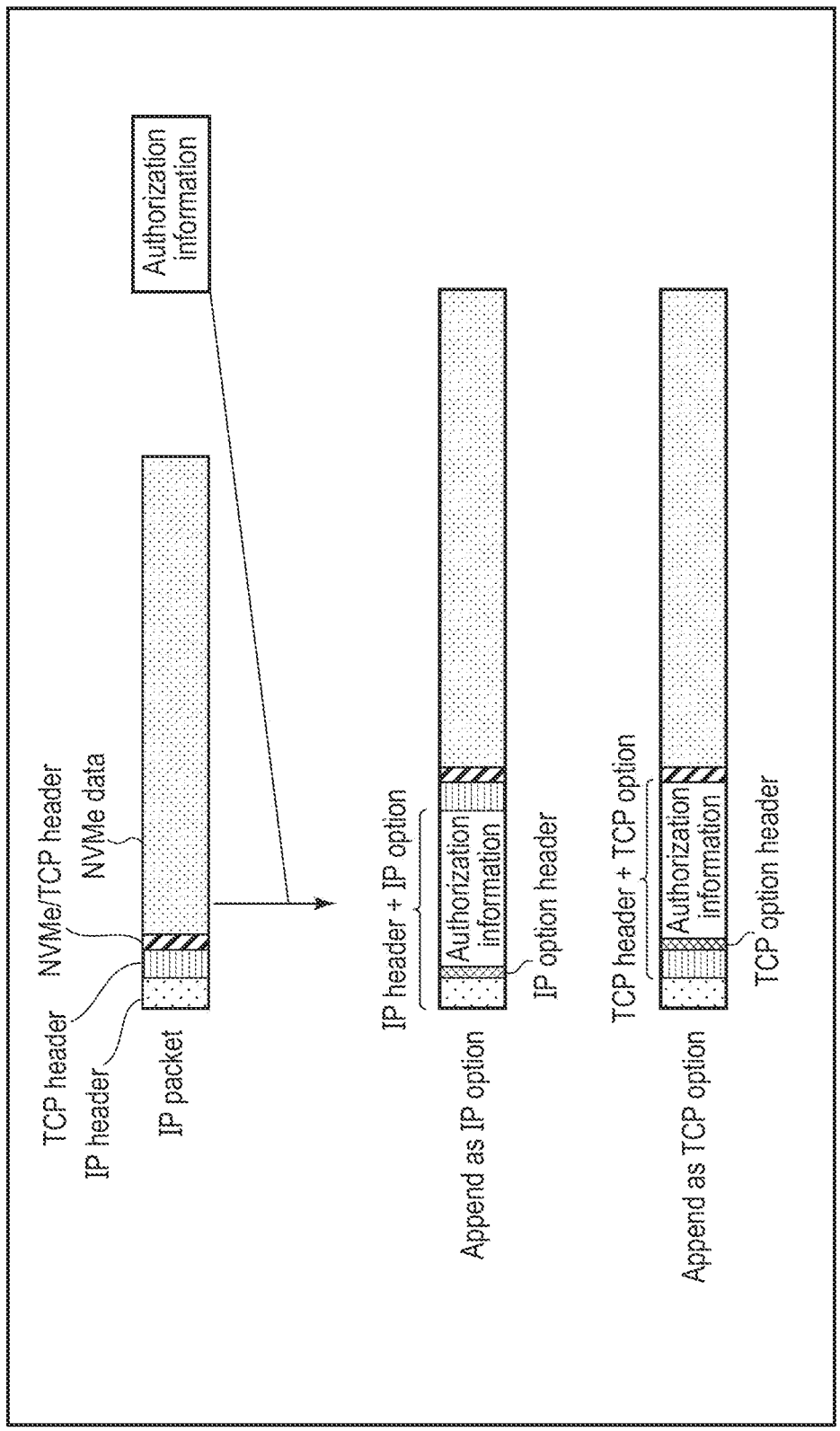
FIG. 9 is a diagram illustrating an example in which authorization information is added to a packet as an Internet Protocol (IP) option or a Transmission Control Protocol (TCP) option, in the computing device according to the first embodiment.

In the case of adding as an IP option or a TCP option, if a packet is already formed, the packet is scanned to determine an insertion location, an IP option header/TCP option header to be added before the authorization information is added according to fields located before and after the insertion location, and then the authorization information is inserted. In a process of generating a packet, at a stage of generating an IP header (or TCP header), a buffer area corresponding to a size of the authorization information and an option header additionally assigned thereto is allocated, and then an IP header (or TCP header) is collectively generated. FIG. 9 illustrates an example in which authorization information is added to a packet as an IP option or a TCP option.

In the case of adding authorization information as an IP option or a TCP option, a mechanism for re-assigning the authorization information in consideration of retransmission due to packet loss is required. For example, it is necessary to maintain a correspondence relationship between a sequence number of a TCP header and authorization information to be assigned and to store the correspondence relationship until reception is confirmed. Note that since retransmission is performed by TCP also in a case where authorization information is inserted as an IP option, the same processing as in the case where authorization information is inserted as a TCP option is required. In order to realize this, for example, a correspondence relationship is stored in the volatile memory unit 102 as illustrated in FIG.

10. FIG. 10 includes a 5-tuple (a destination IP address, a transmission source IP address, a destination port number, a transmission source port number, and a protocol) 1001 for identifying a TCP connection, a sequence number of a transmitted packet (=a packet to which authorization information is assigned) 1002, and an identifier 1003 of the corresponding authorization information. An entry of a row is added for each transmission packet, and is deleted when reception is confirmed.

Note that, in a case where the authorization information insertion processing 202 can detect retransmission, the corresponding authorization information is embedded by referring to the above information each time the retransmission is detected. This can be realized, for example, by providing multiple execution methods of the authorization information insertion processing 202 and distinguishing a case where the communication protocol processing 203, which is a calling side, calls by normal transmission and a case where the communication protocol processing 203 calls by retransmission. On the other hand, in a case where the authorization information insertion processing 202 cannot detect retransmission, it is determined whether to assign authorization information that is already transmitted or assign newly notified authorization information by checking a sequence number each time when a packet into which authorization information is to be inserted is received.

In a case where authorization information is added as a new field, necessary processing varies depending on an insertion position. In a case where authorization information is added immediately after a TCP header (handled as TCP data although the position is the same as a TCP option) or immediately after NVMe data (that is, at the end of the packet), the authorization information is treated as data for TCP, and therefore the measure against retransmission is unnecessary. On the other hand, in a case where authentication information is inserted into another position (for example, in a case where the authentication information is not treated as an IP option after an IP header or in a case where the authentication information is inserted before an IP header), the measure against retransmission is necessary.

In NVMe/TCP, multiple NVMe packets may be stored in one TCP packet or one NVMe packet may be divided and stored in multiple TCP packets. In the present embodiment, since authorization information needs to be assigned per storage control command, a method of assigning authorization information as an IP option or a TCP option cannot be used in a case where multiple NVMe packets are stored (that is, only a method of assigning authorization information to a protocol portion of NVMe can be adopted). In a case where one NVMe packet is divided into multiple TCP packets, authorization information is assigned only to a head packet.

(Authorization Information Adding Processing; Case Using Multiple Connections to Network Storage)

In a case where authorization information is assigned to a packet, communication processing of NVMe/TCP is affected. To avoid this, the authorization information may be transmitted by using a newly established TCP connection. In addition to reception of a packet including a storage control command by NVMe using a main TCP connection, the information storage device 120 on a reception side receives a packet including authorization information by a second TCP connection, associates the packet with the storage control command, and execute the storage control command on the basis of the authorization information. For example, when a TCP connection (first TCP connection) for start of use of a storage in NVMe/TCP is established, a second TCP connection for authorization information is additionally established. At a time of transmission of a storage control command, an identifier for specifying the storage control command is generated, and a pair of the identifier and the authorization information is transmitted via the second TCP connection. Note that a physical connection used for establishing the first TCP connection may be different from a physical connection used for the second TCP connection.

As for an order of transmitting a storage control command and authorization information, there are a method of transmitting the storage control command first and then transmitting the authorization information, and a method of transmitting the authorization information first and then transmitting the storage control command. In a case where a size of the authorization information is small and the storage control command (and data thereof) is large, it is better to transmit the authorization information first. This makes it unnecessary to buffer the storage control command (and data) having a large size for a long time in the information storage device 120 on the reception side. On the other hand, in a case where it takes time from execution of the storage control command to acquisition of a response as in a case of a READ command, the storage control command may be transmitted first, and the authorization information may be transmitted later. This allows the information storage device 120 on the reception side to speculatively execute the storage control command and determine whether or not to return a response by judging the authorization information immediately before returning the response. This may conceal a processing time.

Note that a communication protocol other than TCP may be used for transmission and reception of authorization information. For example, User Datagram Protocol (UDP) may be used or Quick UDP Internet Connections (QUIC) having a retransmission function based on UDP may be used. The maintenance management of the transmission/reception method using the second TCP connection or another communication protocol may be realized by controlling the communication protocol processing 203 by the authorization information insertion processing 202.

(Protection of Authorization Information)

It is assumed that when the authorization server 110 generates authorization information described in the present embodiment, a hash value properly encrypted or generated by a cryptographic hash function such as a message digest is appended to the authorization information. As a result, even if a malicious program operating on the computing device 100 modifies the authorization information, the nonvolatile memory unit 103 and the information storage device 120 that receive the authorization information can detect an abnormality.

Summary of First Embodiment

The first embodiment has been described so far. In the computing device 100, when access to a storage (for example, the nonvolatile memory unit 103, the information storage device 120) is requested by a user or the application 200, an authorization necessary for the storage access is automatically acquired while eliminating intervention by the user or the application, and then a storage control command is issued. This makes it less likely that information stored in the storage is read by an unauthorized operation or unauthorized information is written into the storage.

Second Embodiment

In the computing device 100 according to the first embodiment, the basic processing (the authorization information insertion processing 202, the authorization information request processing 204, the context information collection processing 205) of the first embodiment is executed in the processing unit 101 that executes the application 200 and the like. Therefore, intermediate processing may be undesirably modified by a malicious act of a program or a user who can be promoted to a privileged user. Examples of such a malicious act include intentionally changing a correspondence relationship between authorization information and a storage control command. In this case, unauthorized reading and writing can be undesirably realized by embedding authorization information of a storage control command permitted to be executed in a storage control command whose execution should be inhibited. Furthermore, an attack of disturbing all storage accesses by inserting false authorization information is also conceivable.

(Components and Description Thereof)

Figure 11:
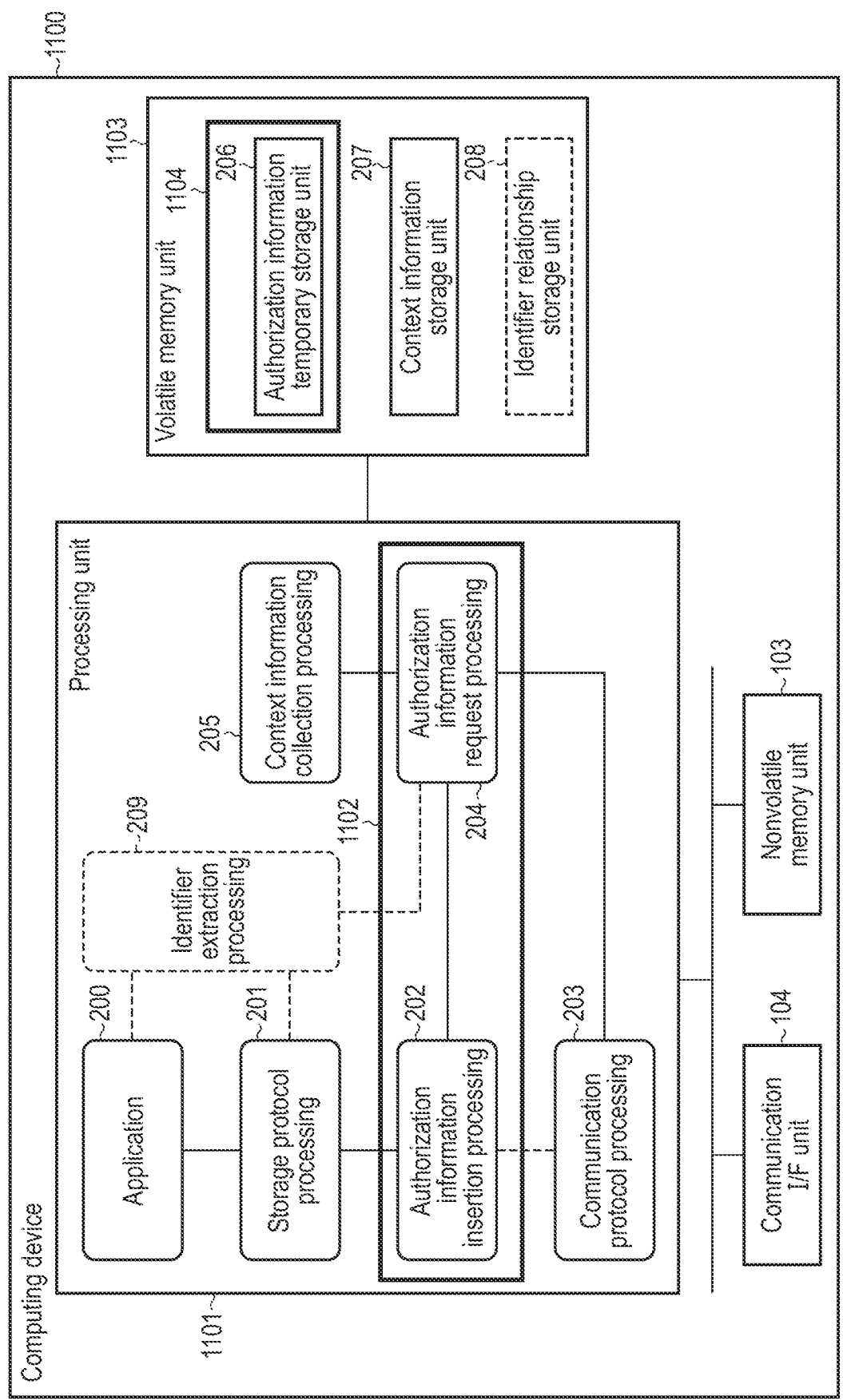
FIG. 11 is a block diagram illustrating an example of a configuration of a computing device according to a second embodiment.

In order to cope with such a problem, part of processing of the processing unit is changed so as to be safely executed. FIG. 11 is a block diagram illustrating an example of a configuration of the present embodiment. Components identical to those in the first embodiment are given identical reference signs.

Although a computing device 1100 has substantially the same configuration as that of the first embodiment, a secure area 1102 is provided in a processing unit 1101. The secure area 1102 includes authorization information insertion processing 202 and authorization information request processing 204. Furthermore, a secure area 1104 is also provided in a part of a volatile memory unit 1103, and a restriction is set so that the secure area 1104 can be referred only from the secure area 1102 of the processing unit 1101. That is, the secure area 1104 is an isolated area that can be used only from the secure area 1102 of the processing unit 1101. The secure area 1104 includes, for example, an authorization information temporary storage unit 206. One or more kinds of processing operating in the secure area 1102 are executed separately from another one or more kinds of processing operating outside, and exchange of information and control between the one or more kinds of processing inside and the one or more kinds of processing outside is permitted when a specific condition is satisfied. Specifically, the one or more kinds of processing operating inside the secure area 1102 and the one or more kinds of processing operating outside the secure area 1102 require transmission and reception of information and control based on a predetermined procedure. The transmission and reception of information and control based on the predetermined procedure is, for example, transmission and reception of information using a specific application programming interface (API). As a result, for example, a malicious program that is not assumed at a time of design cannot request the authorization information insertion processing 202 to embed false authorization information. Furthermore, authorization information that is acquired by the authorization information request processing 204 from an authorization server 110 and in stored in the authorization information temporary storage unit 206 is also prevented from being modified or read by a malicious program.

Note that, to realize the present embodiment, the secure area 1102 for safely executing specific processing may be provided in the processing unit 1101, and the processing executed in the secure area 1102 may be regarded as being safe (this method is employed in the case of FIG. 11), or a specific processing may be regarded as being safe by storing and executing (a program) of the processing in the secure area 1104 on the volatile memory unit 1103 while assuming that the whole processing unit 1101 is safe. In this case, other kinds of processing (programs) are executed after being stored in areas other than the secure area 1104 of the volatile memory unit 1103. For example, in a case where a similar configuration to that of FIG. 11 is realized, a program of the authorization information insertion processing 202 and a program of the authorization information request processing 204 are stored in the secure area 1104, programs of other kinds of processing are stored in areas other than the secure area 1104, and then the stored programs are executed.

(Operation Sequence)

The operation sequence of the present embodiment is the same as that of the first embodiment.

Summary of Second Embodiment

The second embodiment has been described so far. By providing the secure area 1102 in the processing unit 1101 and executing processing that handles authorization information in the secure area 1102, the authorization information can be handled more safely. In addition, by providing the secure area 1104 in the volatile memory unit 1103 and including the authorization information temporary storage unit 206 in the secure area 1104, it is also possible to protect authorization information stored in the authorization information temporary storage unit 206 from a malicious act.

Third Embodiment

In the first and second embodiments described above, authorization information is inserted into a storage control command and is transmitted to a storage by way of software that operates inside the computing device 100 or 1100, particularly inside the processing unit 1101. Therefore, the above embodiments can be applied to both a local storage in the computing device 100 or 1100 and a network storage used via a network. The third embodiment focuses on a storage device connected over a network. A load on a processing unit is reduced by offloading authorization information insertion processing and authorization information temporary storage processing necessary for the authorization information insertion processing to a communication I/F unit.

(Components and Description Thereof)

Figure 12:
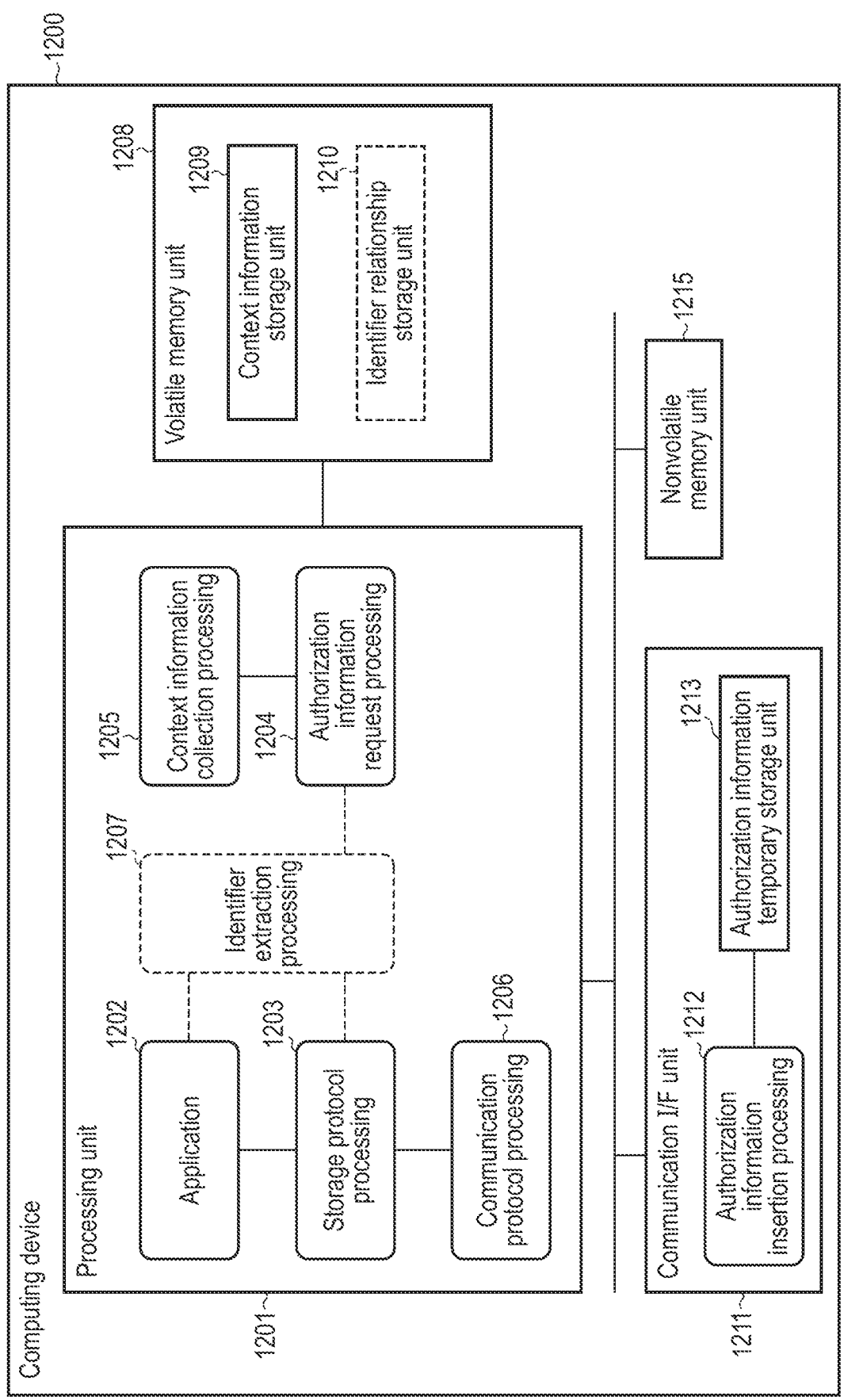
FIG. 12 is a block diagram illustrating an example of a configuration of a computing device according to a third embodiment.

FIG. 12 is a block diagram illustrating an example of a configuration of the present embodiment. The components in FIG. 12 are renumbered although some of the components have identical functions to those described above. A computing device 1200 of the present embodiment includes a processing unit 1201, a volatile memory unit 1208, a communication I/F unit 1211, and a nonvolatile memory unit 1215. The nonvolatile memory unit 1215 is a unit that stores programs executed by the processing unit 1201, data, and the like, and may be implemented so as to protect access by using authorization information according to the first embodiment or the second embodiment.

The processing unit 1201 is a unit that executes an application 1202 executed by the computing device 1200, storage protocol processing 1203, communication protocol processing 1206, authorization information request processing 1204, context information collection processing 1205, identifier extraction processing 1207, and the like.

The volatile memory unit 1208 has a function of temporarily storing a program of processing executed by the processing unit 1201 and a function of storing data for processing. Furthermore, the volatile memory unit 1208 includes a context information storage unit 1209 that stores context information as in the first and second embodiments. Further, the volatile memory unit 1208 may include an identifier relationship storage unit 1210 that stores, for information to be accessed, a correspondence relationship between an identifier used by the application (application level identifier) 1202 and an identifier used by a storage protocol (storage level identifier).

The communication I/F unit 1211 has a function of transmitting and receiving a packet when the application 1202 or the like executed by the processing unit 1201 communicates with an outside of the computing device 1200, and also has a function of inserting authorization information (authorization information insertion processing 1212) as necessary when accessing a storage connected over a network 130 (for example, an information storage device 120). Processing in which each processing executed by the processing unit 1201 instructs the communication I/F unit 1211 to insert authorization information may be realized by a general interface used in hardware control (for example, Memory-Mapped I/O (MMIO), Direct Memory Access (DMA) transfer, or the like).

Note that, in order for the communication I/F unit 1211 to insert authorization information into an appropriate packet, the communication I/F unit 1211 has a function of receiving a correspondence relationship between the authorization information and the packet from the storage protocol processing 1203 and the communication protocol processing 1206. This notification can be realized, for example, by notifying information for identifying the packet (for example, a value of an ID field of an IP header, a value of a sequence number field of a TCP header, a hash value calculated for a part or the whole of the packet, or the like) and the authorization information by a dedicated control command prior to communication. Further, whether or not the notified authorization information can be temporarily stored in the communication I/F unit 1211 may be designated. The authorization information notified to be storable is stored in the authorization information temporary storage unit 1213, and can be added to a subsequent relevant packet. In this case, a condition for identifying the subsequent relevant packet (that is, information for identifying the subsequent relevant packet) may also be included in the notification. In this case, the communication I/F unit 1211 stores, in the authorization information temporary storage unit 1213, the authorization information that is associated with the condition for identifying the subsequent relevant packet. Note that in a case where the subsequent relevant packet can be identified from an obvious relation such as a sequence number of a TCP header, the condition for identifying the subsequent relevant packet need not be included in the notification.

Furthermore, in a case where appropriate authorization information is not stored in the authorization information temporary storage unit 1213 when the communication I/F unit 1211 attempts to embed authorization information based on the notification, the communication I/F unit 1211 has a function of giving a notification prompting the processing unit 1201 to acquire new authorization information. This notification can be realized, for example, by a method in which the communication I/F unit 1211 issues an interrupt in a state where a predetermined flag is set and notifies an identifier of necessary authorization information in an appropriate form such as a descriptor.

(Operation Sequence)

Figure 13:
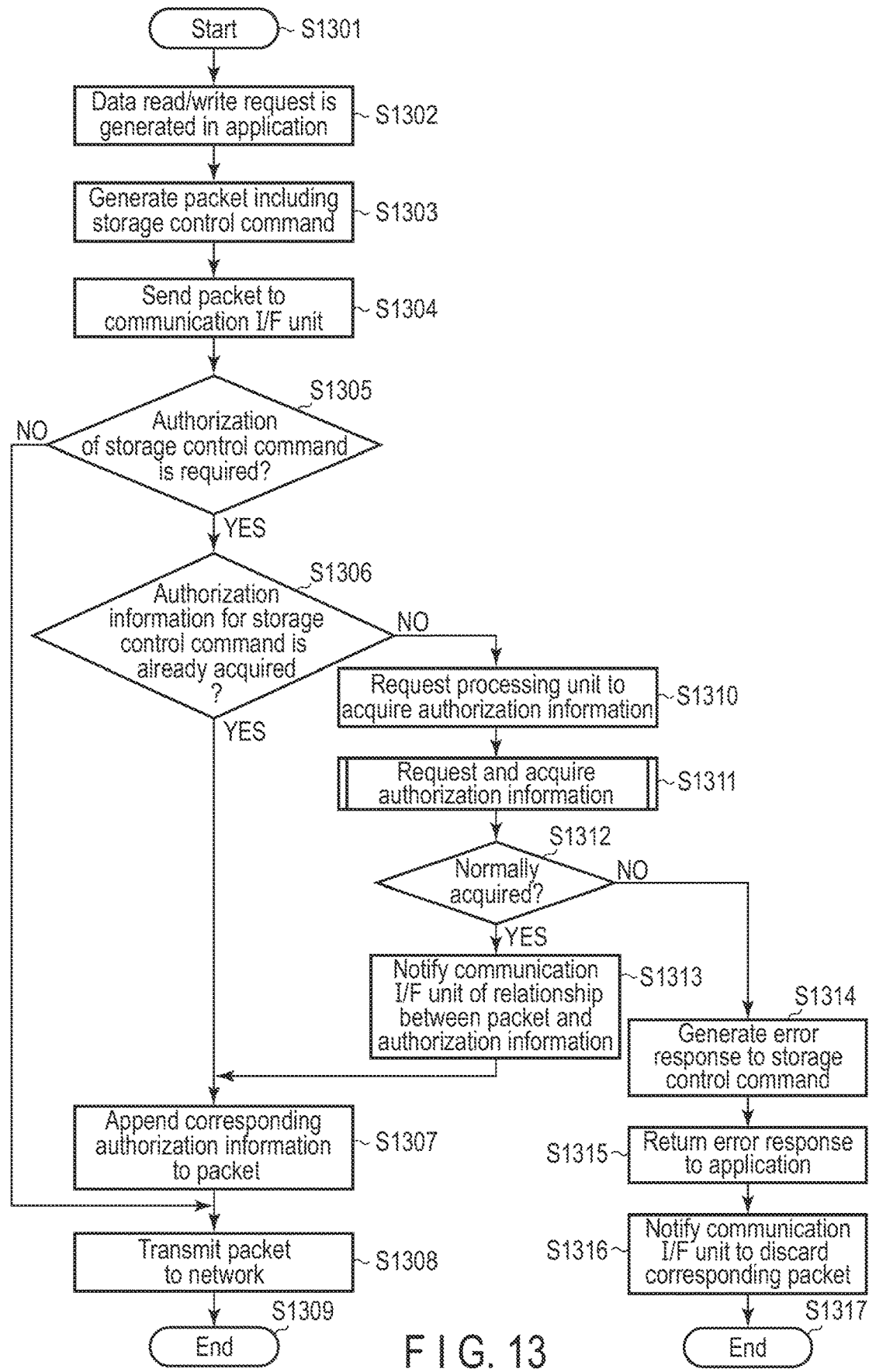
FIG. 13 is a flowchart illustrating an operation sequence of the computing device according to the third embodiment.

An operation sequence of the present embodiment is illustrated in FIG. 13. Although the operation sequence of the present embodiment is basically identical to that illustrated in FIGS. 3A and 3B, steps that depend on the premise that a storage connected over the network 130 (for example, the information storage device 120) is used and insertion of authorization information is performed by the communication I/F unit 1211 are changed.

The present operation sequence starts when a data read/write request is generated in the application 1202 as in the other embodiments (steps S1301 and S1302). The request of the application 1202 is converted into a storage control command in the storage protocol processing 1203, and a packet including the storage control command is generated in the communication protocol processing 1206 (step S1303). Then, the packet is sent to the communication I/F unit 1211 (step S1304).

Upon receiving the packet including the storage control command, the communication I/F unit 1211 checks whether authorization of the storage control command included in the packet required (step S1305). In a case where authorization of the storage control command is not required (NO in step S1305), the communication I/F unit 1211 transmits the packet as it is to the network 130 and ends the processing (steps S1308 and S1309).

In a case where authorization of the storage control command is required (YES in step S1305), the communication I/F unit 1211 checks whether or not the target storage control command (or packet) is a storage control command for which authorization information is already acquired (step S1306). In a case where the authorization information is already acquired (YES in step S1306), the communication I/F unit 1211 extracts or calculates an identifier for identifying the packet, reads authorization information corresponding to the identifier from the authorization information temporary storage unit 1213, and appends the authorization information to the packet (step 1307). More specifically, for example, in a case where the packet including the target storage control command satisfies a condition for identifying a subsequent relevant packet corresponding to authorization information that is stored in the authorization information temporary storage unit 1213, the communication I/F unit 1211 appends the authorization information to the packet. Then, the communication I/F unit 1211 transmits the packet to the network 130 and ends the processing (steps S1308 and S1309).

In a case where authorization information is not acquired for the packet (NO in step S1306), the communication I/F unit 1211 requests the processing unit 1201 to acquire authorization information (step S1310). Upon receipt of the request, the processing unit 1201 (more specifically, the authorization information request processing 1204) requests the authorization server 110 to transmit the authorization information, and acquires the authorization information (step S1311). Processing in step S1311 is identical to that illustrated in FIG. 4, and therefore details thereof are omitted. In a case where the authorization information is not normally acquired (NO in step S1312), the processing unit 1201 generates an error response to the storage control command for which acquisition of the authorization information is necessary (step S1314), and returns the error response to the application 1202 (step S1315). Further, the processing unit 1201 gives a notification prompting the communication I/F unit 1211 to discard the packet that has triggered the request for acquisition of the authorization information and perform error processing (step S1316). For this notification, the same mechanism as that used for notification of the authorization information may be used.

In a case where the authorization information has been normally acquired (YES in step S1312), the processing unit 1201 notifies the communication I/F unit of the authorization information and notifies the communication I/F unit 1211 of a correspondence with the packet that has triggered the request for acquisition of the authorization information (step S1313). Then, the communication I/F unit 1211 resumes processing of appending the authorization information to the packet, appends the authorization information to the packet (step S1307), transmits the packet to the network 130 (step S1308), and ends the processing (step S1309).

The operation sequence of the present embodiment has been described so far.

Summary of Third Embodiment

The third embodiment has been described so far. In a case where target data is to be stored in a storage connected over the network 130, the authorization information insertion processing is offloaded from the processing unit to the communication I/F unit. This can reduce overhead of processing related to the addition of the authorization information, thereby suppressing performance degradation of storage I/O processing and securing safety.

Fourth Embodiment

The fourth embodiment is a modification of the third embodiment, and a part of storage protocol processing and communication protocol processing are also offloaded to a communication I/F unit in addition to authorization information insertion processing.

(Components and Description Thereof)

FIG. 14 is a block diagram illustrating an example of a configuration of the present embodiment. A difference from the third embodiment illustrated in FIG. 12 is that the storage protocol processing is divided into storage protocol processing (former part) 1403 and storage protocol processing (latter part) 1411, and the storage protocol processing (latter part) 1411 and the communication protocol processing 1414 are offloaded to a communication I/F unit 1410. The other components are identical to those of the third embodiment.

The storage protocol processing is divided mainly depending on whether or not the processing is processing necessary for access to a local storage, such as processing of a file system. The processing necessary for access to a local storage is included in the storage protocol processing (the former part) 1403, and processing specific to a storage connected over a network is included in the storage protocol processing (latter part) 1411. The storage protocol processing (former part) 1403 is processing that does not depend on a communication protocol (for example, NVMe). The storage protocol processing (latter part) 1411 is processing that depends on the communication protocol.

(Operation Sequence)

Figure 15:
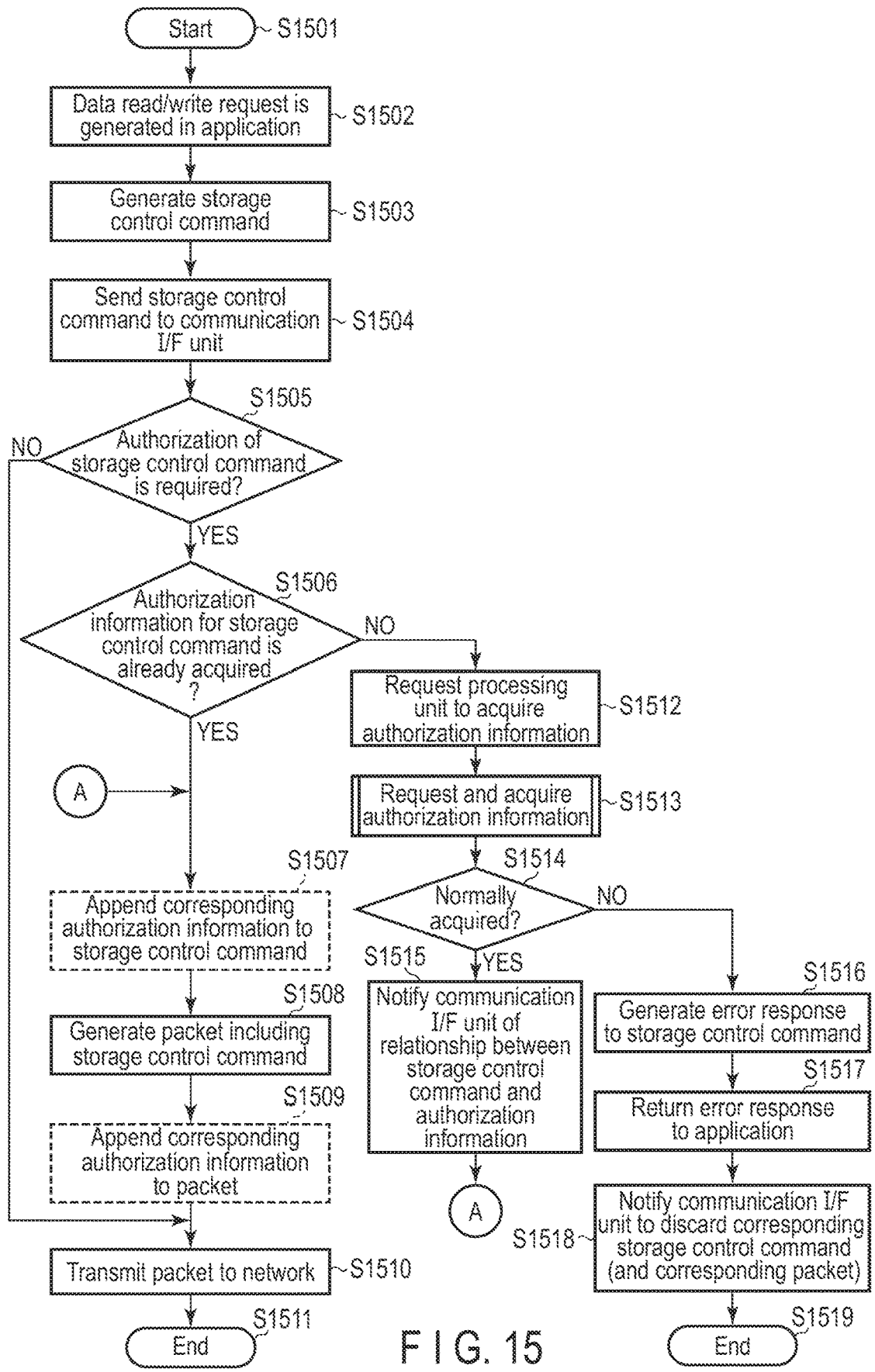
FIG. 15 is a flowchart illustrating an operation sequence of the computing device according to the fourth embodiment.

FIG. 15 illustrates an operation sequence of the present embodiment. This sequence is almost identical to that of the third embodiment illustrated in FIG. 13. Since the communication I/F unit 1410 is notified of a read/write request in a state of a storage control command, corresponding portions have been changed (steps S1503, S1504, S1507, S1508, S1509, S1515, and S1518). The changed steps will be described below.

Step S1503 has been changed because the storage protocol processing is divided into the storage protocol processing (former part) 1403 and the storage protocol processing (latter part) 1411. In step S1503, processing up to a generation of storage control command executable in the storage protocol processing (former part) 1403 is performed. Then, in step S1504, the storage control command is sent to the communication I/F unit 1410.

Steps S1507 and S1509 may or may not be executed depending on a form of embedding authorization information in the storage control command. Step S1507 is a step executed in a case where authorization information is embedded in the storage control command at a level of a storage protocol. On the other hand, step S1509 is a step executed in a case where authorization information is embedded in a packet at a level of a communication protocol. Step S1508 interposed between steps S1507 and S1509 is a step of processing the storage control command into a packet, and is performed in communication protocol processing 1414 newly offloaded to the communication I/F unit 1410.

Step S1515 has been changed because how a target to which authorization information is to be appended is identified by the processing unit 1401 and the communication I/F unit 1410 has been changed to a storage control command. That is, in step S1515, the change is made such that a correspondence relationship between the storage control command notified from the communication I/F unit 1410 and newly acquired authorization information is notified from the processing unit 1401 to the communication I/F unit 1410. S1518 has also been changed in a similar manner.

Summary of Fourth Embodiment

The fourth embodiment has been described above. In a case where target data is to be stored in a storage connected over the network 130, a part of the storage protocol processing (storage protocol processing (latter part) 1411) and the communication protocol processing 1414 are offloaded from the processing unit to the communication I/F unit in addition to the authorization information insertion processing. This can further reduce overhead of processing related to the addition of the authorization information, thereby suppressing performance degradation of storage I/O processing and securing safety.

Supplement to Third and Fourth Embodiments

In the configurations of the third and fourth embodiments, one or some kinds of processing are offloaded to the communication I/F unit based on the first embodiment. In addition to this, the concepts of the secure areas 1102 and 1104 described in the second embodiment may be applied. That is, in the processing offloaded to the communication I/F unit 1211 or 1410, a portion related to embedding of authorization information and a portion related to temporary storage of the authorization information may be implemented and protected as secure areas. Furthermore, the authorization information request processing 1204 or 1404 of the processing unit 1201 or 1401 may also be implemented in the secure area in the processing unit 1201 or 1401 so that the processing unit 1201 or 1401 and the secure area of the communication I/F unit 1211 or 1410 operate in cooperation with each other.

As described above, according to the first to fourth embodiments, unauthorized access to an information storage device can be prevented. The processing unit executes an application program. The processing unit executes storage protocol processing of receiving a first I/O request to a nonvolatile memory unit from the application program, generating one or more first control commands for controlling the nonvolatile memory unit based on the first I/O request, and controlling the nonvolatile memory unit. The processing unit executes authorization information necessity determination processing of determining whether or not the first I/O request or the one or more first control commands require authorization information to access the nonvolatile memory unit. The processing unit executes authorization information acquisition processing of, in a case where it is determined that the first I/O request or the one or more first control commands require authorization information to access the nonvolatile memory unit, transmitting context information indicating at least one of a situation and a reason of generation of the first I/O request to an external server device and requesting the authorization information, and acquiring the authorization information from the server device, by communicating with the server device via the communication interface unit. The processing unit executes authorization information insertion processing of inserting or associating the acquired authorization information into or with the first I/O request or the one or more first control commands. The processing unit executes context collection processing of collecting the context information to be transmitted to the server device and storing the context information in the temporary memory unit before requesting the authorization information in the authorization information acquisition processing.

Therefore, in the computing device, for example, when an I/O request to a storage (for example, the nonvolatile memory unit 103, the information storage device 120) is generated by the application, authorization information necessary for access to the storage is automatically acquired while eliminating intervention of the application, and then a storage control command is issued. This makes it less likely that information stored in the storage is read by an unauthorized operation or that unauthorized information is written into the storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing device that executes an application program including processing of inputting information from a nonvolatile memory and outputting information to the nonvolatile memory, the computing device comprising:
   a processor;
   a communication interface configured to communicate with a device outside the computing device according to a communication protocol; and
   a temporary memory configured to temporarily store information that is used by the processor, wherein
   the processor is configured to execute:
     the application program;
     storage protocol processing of receiving a first I/O request to the nonvolatile memory from the application program, generating one or more first control commands for controlling the nonvolatile memory based on the first I/O request, and controlling the nonvolatile memory;
     authorization information necessity determination processing of determining whether or not the first I/O request or the one or more first control commands require authorization information to access the nonvolatile memory;
     authorization information acquisition processing of, in a case where it is determined that the first I/O request or the one or more first control commands require authorization information to access the nonvolatile memory, transmitting context information indicating at least one of a situation and a reason of generation of the first I/O request to an external server device and requesting the authorization information, and acquiring the authorization information from the server device, by communicating with the server device via the communication interface;
     authorization information insertion processing of inserting or associating the acquired authorization information into or with the first I/O request or the one or more first control commands; and
     context collection processing of collecting the context information to be transmitted to the server device and storing the context information in the temporary memory before requesting the authorization information in the authorization information acquisition processing.

2. The computing device according to claim 1, wherein the processor is further configured to execute identifier extraction processing of:
   extracting a first identifier from the first I/O request that the application program inputs first information from the nonvolatile memory or outputs the first information to the nonvolatile memory, the first identifier being used to identify the first information;
   extracting one or more second identifiers from the one or more first control commands that are generated from the first I/O request to the nonvolatile memory including the first identifier in the storage protocol processing to control the nonvolatile memory, the one or more second identifiers being used to identify the first information; and
   storing the first identifier and the one or more second identifiers that are associated with the first identifier, in the temporary memory, and
   the authorization information insertion processing further comprises, in a case where the acquired authorization information is inserted into or associated with the one or more first control commands, identifying the one or more first control commands into or with which the acquired authorization information is to be inserted or associated by using a correspondence relationship between the first identifier and the one or more second identifiers that are generated in the identifier extraction processing and are stored in the temporary memory.

3. The computing device according to claim 2, wherein the authorization information acquisition processing further comprises storing, in the temporary memory, the acquired authorization information and an expiration time of the authorization information that are associated with at least one of the first identifier and the one or more second identifiers and are associated with an identifier for the context information that is used to acquire the authorization information,
the storage protocol processing further comprises receiving a second I/O request to the nonvolatile memory from the application program, generating one or more second control commands for controlling the nonvolatile memory based on the second I/O request, and controlling the nonvolatile memory, the authorization information necessity determination processing further comprises determining whether or not the second I/O request or the one or more second control commands require authorization information to access the nonvolatile memory, and the authorization information insertion processing further comprises, in a case where it is determined that the second I/O request or the one or more second control commands require authorization information to access the nonvolatile memory and authorization information that falls within an expiration time and corresponds to the second I/O request or the one or more second control commands is stored in the temporary memory, inserting or associating the authorization information that falls within the expiration time and corresponds to the second I/O request or the one or more second control commands into or with the second I/O request or the one or more second control commands.

4. The computing device according to claim 3, wherein the processor is further configured to execute, in a case where it is detected that the nonvolatile memory is connected via an external device that is communicable via the communication interface, communication protocol processing of processing an I/O request or a control command as data of a communication protocol and communicating with the external device, and the authorization information insertion processing further comprises, in a case where it is detected that the nonvolatile memory is connected via the external device that is communicable via the communication interface, notifying the external device of the acquired authorization information by a method using any one of an I/O request, a control command, a header portion or a data portion of a communication protocol including an I/O request or a control command, and a header portion or a data portion of a first packet different from a second packet of the communication protocol including an I/O request or a control command.

5. The computing device according to claim 4, wherein the authorization information insertion processing further comprises using a physical connection or a logical connection different from a physical connection or a logical connection for transmitting and receiving the second packet when notifying the external device of the acquired authorization information by using the header portion or the data portion of the first packet different from the second packet.

6. The computing device according to claim 1, wherein the processor is configured to include a secure area in which one or more kinds of processing are executed separately from another one or more kinds of processing and in which exchanging information and control between the one or more kinds of processing and the other one or more kinds of processing is capable when a specific condition is satisfied, the processor is configured to execute the authorization information acquisition processing and the authorization information insertion processing in the secure area, and the temporary memory is configured to:
include an isolated area accessible from the secure area of the processor; and
temporarily store the authorization information acquired from the server device in the isolated area.

7. A computing device that executes an application program including processing of inputting information from a nonvolatile memory and outputting information to the nonvolatile memory, the computing device comprising:
a processor;
a communication interface configured to communicate with a device outside the computing device according to a communication protocol; and
a first temporary memory configured to temporarily store information that is used by the processor,
wherein
the processor is configured to execute:
the application program; and
storage protocol processing of receiving a first I/O request to the nonvolatile memory from the application program, generating one or more first control commands for controlling the nonvolatile memory based on the first I/O request, and controlling the nonvolatile memory,
the communication interface is configured to execute authorization information necessity determination processing of determining whether or not the first I/O request or the one or more first control commands require authorization information to access the nonvolatile memory,
the processor is configured to execute:
authorization information acquisition processing of, in a case where it is determined that the first I/O request or the one or more first control commands require authorization information to access the nonvolatile memory, transmitting context information indicating at least one of a situation and a reason of generation of the first I/O request to an external server device and requesting the authorization information, and acquiring the authorization information from the server device, by communicating with the server device via the communication interface; and
context collection processing of collecting the context information to be transmitted to the server device and storing the context information in the first temporary memory before requesting the authorization information in the authorization information acquisition processing, and
the communication interface is configured to:
execute authorization information insertion processing of inserting or associating the acquired authorization information into or with the first I/O request or the one or more first control commands; and
store the acquired authorization information in a second temporary memory in the communication interface.

8. The computing device according to claim 7, wherein the processor is further configured to execute identifier extraction processing of:
extracting a first identifier from the first I/O request that the application program inputs first information from the nonvolatile memory or outputs the first information to the nonvolatile memory, the first identifier being used to identify the first information;
extracting one or more second identifiers from the one or more first control commands that are generated from the first I/O request to the nonvolatile memory including the first identifier in the storage protocol processing to control the nonvolatile memory, the one or more second identifiers being used to identify the first information; and
storing the first identifier and the one or more second identifiers that are associated with the first identifier, in the first temporary memory, and the authorization information insertion processing further comprises, in a case where the acquired authorization information is inserted into or associated with the one or more first control commands, identifying the one or more first control commands into or with which the acquired authorization information is to be inserted or associated by using a correspondence relationship between the first identifier and the one or more second identifiers that are generated in the identifier extraction processing and are stored in the first temporary memory.

9. The computing device according to claim 8, wherein the communication interface is further configured to store, in the second temporary memory, the acquired authorization information that is associated with information for identifying a packet to which the authorization information is assigned, the storage protocol processing further comprises receiving a second I/O request to the nonvolatile memory from the application program, generating one or more second control commands for controlling the nonvolatile memory based on the second I/O request, and controlling the nonvolatile memory, the authorization information necessity determination processing further comprises determining whether or not the second I/O request or the one or more second control commands require authorization information to access the nonvolatile memory, and the authorization information insertion processing further comprises, in a case where it is determined that the second I/O request or the one or more second control commands require authorization information to access the nonvolatile memory and authorization information corresponding to a packet including the second I/O request or the one or more second control commands is stored in the second temporary memory, inserting or associating the authorization information that corresponds to the second I/O request or the one or more second control commands into or with the second I/O request or the one or more second control commands.

10. The computing device according to claim 9, wherein the processor is further configured to execute, in a case where it is detected that the nonvolatile memory is connected via an external device that is communicable via the communication interface, communication protocol processing of processing an I/O request or a control command as data of a communication protocol and communicating with the external device, and the authorization information insertion processing further comprises, in a case where it is detected that the nonvolatile memory is connected via the external device that is communicable via the communication interface, notifying the external device of the acquired authorization information by a method using any one of an I/O request, a control command, a header portion or a data portion of a communication protocol including an I/O request or a control command, and a header portion or a data portion of a first packet different from a second packet of a communication protocol including an I/O request or a control command.

11. The computing device according to claim 9, wherein the communication interface is further configured to execute, in a case where it is detected that the nonvolatile memory is connected via an external device that is communicable via the communication interface, communication protocol processing of processing an I/O request or a control command as data of a communication protocol and communicating with the external device, and the authorization information insertion processing further comprises, in a case where it is detected that the nonvolatile memory is connected via the external device that is communicable via the communication interface, notifying the external device of the acquired authorization information by a method using any one of an I/O request, a control command, a header portion or a data portion of a communication protocol including an I/O request or a control command, and a header portion or a data portion of a first packet different from a second packet of a communication protocol including an I/O request or a control command.

12. The computing device according to claim 10, wherein the authorization information insertion processing further comprises using a physical connection or a logical connection different from a physical connection or a logical connection for transmitting and receiving the second packet when notifying the external device of the acquired authorization information by using the first packet different from the second packet.

13. The computing device according to claim 7, wherein the communication interface is configured to include a secure area in which one or more kinds of processing are executed separately from other one or more kinds of processing and in which exchanging information and control between the one or more kinds of processing and the other one or more kinds of processing when a specific condition is satisfied, the communication interface is configured to execute the authorization information insertion processing in the secure area, and the second temporary memory in the communication interface is configured to:

include an isolated area accessible from the secure area of the communication interface; and temporarily store the authorization information acquired from the server device in the isolated area.

14. A control method of controlling a computing device that executes an application program including processing of inputting information from a nonvolatile memory and outputting information to the nonvolatile memory, the computing device comprising:

a communication interface configured to communicate with an device outside the computing device according to a communication protocol; and a temporary memory configured to temporarily store information, the control method comprising:

executing the application program;

receiving a first I/O request to the nonvolatile memory from the application program, generating one or more first control commands for controlling the nonvolatile memory based on the first I/O request, and controlling the nonvolatile memory;

determining whether or not the first I/O request or the one or more first control commands require authorization information to access the nonvolatile memory;

in a case where it is determined that the first I/O request or the one or more first control commands require authorization information to access the nonvolatile memory, transmitting context information indicating at least one of a situation and a reason of generation of the first I/O request to an external server device and requesting the authorization information, and acquiring the authorization information from the server device, by communicating with the server device via the communication interface;

inserting or associating the acquired authorization information into or with the first I/O request or the one or more first control commands; and collecting the context information to be transmitted to the server device and storing the context information in the temporary memory before requesting the authorization information.

15. The control method according to claim 14, further comprising:

extracting a first identifier from the first I/O request that the application program inputs first information from the nonvolatile memory or outputs the first information to the nonvolatile memory, the first identifier being used to identify the first information;

extracting one or more second identifiers from the one or more first control commands that are generated from the first I/O request to the nonvolatile memory including the first identifier in the storage protocol processing to control the nonvolatile memory, the one or more second identifiers being used to identify the first information;

storing the first identifier and the one or more second identifiers that are associated with the first identifier, in the temporary memory; and in a case where the acquired authorization information is inserted into or associated with the one or more first control commands, identifying the one or more first control commands into or with which the acquired authorization information is to be inserted or associated by using a correspondence relationship between the first identifier and the one or more second identifiers that are generated in the identifier extraction processing and are stored in the temporary memory.

16. The control method according to claim 15, further comprising:

storing, in the temporary memory, the acquired authorization information and an expiration time of the authorization information that are associated with at least one of the first identifier and the one or more second identifiers and are associated with an identifier for the context information that is used to acquire the authorization information;

receiving a second I/O request to the nonvolatile memory from the application program, generating one or more second control commands for controlling the nonvolatile memory based on the second I/O request, and controlling the nonvolatile memory;

determining whether or not the second I/O request or the one or more second control commands require authorization information to access the nonvolatile memory; and in a case where it is determined that the second I/O request or the one or more second control commands require authorization information to access the nonvolatile memory and authorization information that falls within an expiration time and corresponds to the second I/O request or the one or more second control commands is stored in the temporary memory, inserting or associating the authorization information that falls within the expiration time and corresponds to the second I/O request or the one or more second control commands into or with the second I/O request or the one or more second control commands.

17. The control method according to claim 16, further comprising:

in a case where it is detected that the nonvolatile memory is connected via an external device that is communicable via the communication interface, executing communication protocol processing of processing an I/O request or a control command as data of a communication protocol and communicating with the external device; and in a case where it is detected that the nonvolatile memory is connected via the external device that is communicable via the communication interface, notifying the external device of the acquired authorization information by a method using any one of an I/O request, a control command, a header portion or a data portion of a communication protocol including an I/O request or a control command, and a header portion or a data portion of a first packet different from a second packet of the communication protocol including an I/O request or a control command.

18. The control method according to claim 17, further comprising using a physical connection or a logical connection different from a physical connection or a logical connection for transmitting and receiving the second packet when notifying the external device of the acquired authorization information by using the header portion or the data portion of the first packet different from the second packet.

19. The control method according to claim 14, wherein the computing device further comprises a processor configured to include a secure area in which one or more kinds of processing are executed separately from another one or more kinds of processing and in which exchanging information and control between the one or more kinds of processing and the other one or more kinds of processing is capable when a specific condition is satisfied, the control method further comprises executing, in the secure area, processing for acquiring the authorization information from the server device and processing for inserting or associating the acquired authorization information into or with the first I/O request or the one or more first control commands, and the temporary memory is configured to include an isolated area accessible from the secure area of the processor, and the control method further comprises temporarily storing the authorization information acquired from the server device in the isolated area.

* * * * *